United States Patent
Luo et al.

(10) Patent No.: US 11,418,925 B2
(45) Date of Patent: Aug. 16, 2022

(54) COMMUNICATION METHOD AND APPARATUS

(71) Applicant: HUAWEI TECHNOLOGIES CO., LTD., Guangdong (CN)

(72) Inventors: Haiyan Luo, Shanghai (CN); Jun Wang, Shanghai (CN); Mingzeng Dai, Shenzhen (CN); Yizhen Wu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/094,546

(22) Filed: Nov. 10, 2020

(65) Prior Publication Data

US 2021/0058747 A1 Feb. 25, 2021

Related U.S. Application Data

(63) Continuation of application No. PCT/CN2019/086469, filed on May 10, 2019.

(30) Foreign Application Priority Data

May 11, 2018 (CN) .......................... 201810447468.3

(51) Int. Cl.
*H04L 12/28* (2006.01)
*H04W 4/06* (2009.01)
(Continued)

(52) U.S. Cl.
CPC ............. *H04W 4/06* (2013.01); *H04W 28/18* (2013.01); *H04W 76/11* (2018.02); *H04W 76/40* (2018.02)

(58) Field of Classification Search
CPC ....... H04W 4/06; H04W 28/18; H04W 76/11; H04W 76/40; H04W 92/20; H04W 76/12; H04L 12/1877; H04L 12/189
(Continued)

(56) References Cited

U.S. PATENT DOCUMENTS

2010/0322128 A1* 12/2010 Becker .................... H04W 4/08
370/312
2012/0328103 A1* 12/2012 Feng .................... H04W 12/041
380/270
(Continued)

FOREIGN PATENT DOCUMENTS

CN 101931898 A 12/2010
CN 104469691 A 3/2015
(Continued)

OTHER PUBLICATIONS

Huawei, HiSilicon, Support of unicast and groupcast for eV2X. 3GPP TSG-RAN WG2 Meeting #101 , Athens, Greece, Feb. 26 Mar. 2, 2018, R2-1801903, 6 pages.
(Continued)

*Primary Examiner* — Chuong T Ho
(74) *Attorney, Agent, or Firm* — Womble Bond Dickinson (US) LLP

(57) ABSTRACT

Communication methods and apparatuses to reduce a transmission delay of a multicast message are described. A first radio access network device receives a first message from a terminal device on a radio bearer or a first message from a second radio access network device. The first radio access network device multicasts the first message through a first air interface.

20 Claims, 5 Drawing Sheets

(51) Int. Cl.
*H04W 76/11* (2018.01)
*H04W 76/40* (2018.01)
*H04W 28/18* (2009.01)

(58) Field of Classification Search
USPC .................................................. 370/312, 390
See application file for complete search history.

(56) References Cited

U.S. PATENT DOCUMENTS

| | | | | |
|---|---|---|---|---|
| 2018/0227718 | A1* | 8/2018 | Lu ........................... | H04W 4/06 |
| 2019/0149958 | A1* | 5/2019 | Zhang .................. | H04W 4/029 |
| | | | | 455/456.1 |
| 2019/0281419 | A1* | 9/2019 | Deng .................... | H04W 76/11 |
| 2020/0092685 | A1* | 3/2020 | Fehrenbach ......... | H04B 7/2606 |
| 2020/0092923 | A1* | 3/2020 | Abraham ............. | H04W 76/40 |

FOREIGN PATENT DOCUMENTS

| | | | |
|---|---|---|---|
| CN | 105992167 | A | 10/2016 |
| CN | 106658418 | A | 5/2017 |
| CN | 106686552 | A | 5/2017 |
| CN | 107135486 | A | 9/2017 |
| WO | 2011110078 | A1 | 9/2011 |
| WO | 2014082291 | A1 | 6/2014 |
| WO | 2017046977 | A1 | 3/2017 |
| WO | 2017201360 | A1 | 11/2017 |

OTHER PUBLICATIONS

3GPP TS 23.285 V15.0.0 (Mar. 2018), 3rd Generation Partnership Project; Technical Specification Group Services and System Aspects; Architecture enhancements for V2X services (Release 15), 36 pages.

3GPP TR 23.786 V0.5.0 (May 2018), 3rd Generation Partnership Project; Technical Specification Group Services and System Aspects; Study on architecture enhancements for EPS and 5G System to support advanced V2X services (Release 16), 37 pages.

* cited by examiner

COMMUNICATION METHOD AND APPARATUS

CROSS-REFERENCE TO RELATED APPLICATIONS

This application is a continuation of International Application No. PCT/CN2019/086469, filed on May 10, 2019, which claims priority to Chinese Patent Application No. 201810447468.3, filed on May 11, 2018, The disclosures of the aforementioned applications are hereby incorporated by reference in their entireties.

TECHNICAL FIELD

The application relates to the field of communications technologies, and in particular, to a communication method and a communications apparatus.

BACKGROUND

In the prior art, for an internet of vehicles service, data is usually multicast in the following manner. A terminal device sends a multicast message to a base station, the base station uploads the multicast message to a core network, and then the core network triggers the base station to perform multicast, resulting in a relatively large delay.

SUMMARY

The application provides a communication method and a communications apparatus, to reduce a transmission delay of a multicast message.

In an embodiment, the application provides a communication method. The method includes: receiving, by a first radio access network device, a first message from a terminal device on a radio bearer, and then multicasting the first message through a first air interface, where the radio bearer is a bearer between the first radio access network device and the terminal device.

Alternatively, the method includes: receiving, by the first radio access network device, a first message from a second radio access network device through a user plane tunnel, and then multicasting the first message through a first air interface, where the user plane tunnel is a tunnel between the first radio access network device and the second radio access network device.

The first air interface is an air interface for communication between the first radio access network device and a terminal device within a management range of the first radio access network device. For example, the first air interface may be an LTE air interface for communication between an LTE base station and a terminal device in an LTE system, or may be an NR air interface for communication between an NR base station and a terminal device in a 5G NR system.

In an embodiment of the application, after receiving the first message, the first radio access network device may directly multicast the first message through the first air interface. Compared with that the first radio access network device reports the first message to a core network element after receiving the first message, and then multicast the first message based on an indication of the core network element, this can reduce a transmission delay of the first message.

In an embodiment of the application, the radio bearer is a first radio bearer, and the receiving, by a first radio access network device, a first message from a terminal device on a radio bearer includes: receiving, by the first radio access network device, the first message from the terminal device on the first radio bearer, where the first radio bearer is used to transmit a first message that meets a first condition, and the first condition is: the first message is transmitted on the first radio bearer and directly multicast through the first air interface.

In an embodiment of the application, a new radio bearer used to forward a first message to be directly multicast may be set up between the first radio access network device and the terminal device, and the radio bearer may be used to transmit all first messages that need to be directly multicast. According to the method in the application, direct multicast of all first messages can be implemented by using one radio bearer, and utilization of the radio bearer is relatively high.

In an embodiment of the application, the radio bearer is a second radio bearer, and the receiving, by a first radio access network device, a first message from a terminal device on a radio bearer includes: receiving, by the first radio access network device, the first message from the terminal device on the second radio bearer, where the second radio bearer is used to transmit a first message that meets a second condition, there is a correspondence between the second radio bearer and one or more of a group identity of the terminal device, a service identity of the terminal device, or a quality of service QoS parameter of the first message, and the second condition is: the first message is transmitted on the second radio bearer and is directly multicast through the first air interface.

In an embodiment of the application, the second radio bearer may have a correspondence with the group identity, the service identity, QoS parameter, and the like. In this case, a data amount of a protocol header that carries the first message may be correspondingly reduced. For example, if there is a correspondence between the group identity and the second radio bearer, the group identity does not need to be added to the protocol header that carries the first message, and air interface overheads are relatively small.

In an embodiment of the application, the radio bearer is a third radio bearer, and the receiving, by a first radio access network device, a first message from a terminal device on a radio bearer includes: receiving, by the first radio access network device, the first message from the terminal device on the third radio bearer, where the third radio bearer is used to transmit a first message that meets a third condition or a fourth condition, the third condition is: the first message is transmitted on the third radio bearer and is directly multicast through the first air interface, and the fourth condition is: the first message is transmitted on the third radio bearer and the first message is reported to a core network element; and the multicasting, by the first radio access network device, the first message through a first air interface includes:

multicasting, by the first radio access network device, the first message through the first air interface when the first message carries a first indication, where the first indication is used to indicate the first radio access network device to directly multicast the first message through the first air interface when the first radio access network device receives the first message.

In an embodiment of the application, the third radio bearer may be an existing radio bearer, and the existing radio bearer is an existing radio bearer used to report the first message to the core network element. For example, direct multicast of the first message can be implemented by using the existing bearer, and there is no need to set up a new bearer. Therefore, a change to an existing network is relatively small, an implementation is easy, and utilization of the existing bearer can be increased.

In an embodiment of the application, the radio bearer is a fourth radio bearer, and the receiving, by a first radio access network device, a first message from a terminal device on a radio bearer includes: receiving, by the first radio access network device, the first message from the terminal device on the fourth radio bearer, where the fourth radio bearer is used to transmit a first message that meets a fifth condition or a sixth condition, the fifth condition is: the first message is transmitted on the fourth radio bearer and is directly multicast through the first air interface, and the sixth condition is: the first message is transmitted on the fourth radio bearer and the first message is reported to a core network element; and the multicasting, by the first radio access network device, the first message through a first air interface includes: multicasting, by the first radio access network device, the first message through the first air interface when a QoS parameter carried in the first message meets a predetermined condition. In an embodiment of the application, the fourth bearer may be an existing bearer. Compared with the method in the foregoing embodiment, in the method in this embodiment, no indication needs to be added to the first message, so that transmission efficiency can be further improved, and air interface overheads can be reduced.

In an embodiment of the application, the user plane tunnel is a first user plane tunnel, and the receiving, by a first radio access network device, a first message from a second radio access network device through a user plane tunnel includes: receiving, by the first radio access network device, the first message from the second radio access network device through the first user plane tunnel, where the first user plane tunnel is configured to forward a first message that meets a seventh condition, and the seventh condition is: the first message is forwarded through the first user plane tunnel and is directly multicast through the first air interface.

In an embodiment of the application, direct multicast of all first messages can be implemented by setting up one new first user plane tunnel. Compared with a solution of setting up a plurality of user plane tunnels, in the method in this embodiment, utilization of the user plane tunnel is relatively high.

In an embodiment of the application, the user plane tunnel is a second user plane tunnel, and the receiving, by a first radio access network device, a first message from a second radio access network device through a user plane tunnel includes: receiving, by the first radio access network device, the first message from the second radio access network device through the second user plane tunnel, where the second user plane tunnel is configured to forward a first message that meets an eighth condition, there is a correspondence between the second user plane tunnel and one or more of a group identity of the terminal device, a service identity of the terminal device, and a QoS parameter of the first message, and the eighth condition is: the first message is forwarded through the second user plane tunnel and is directly multicast through the first air interface.

In an embodiment of the application, the second user plane tunnel may have a correspondence with the group identity, the service identity, QoS, and the like. For example, when there is a correspondence between the second radio bearer and the service identity of the terminal device, a protocol header that carries the first message does not include the service identity of the terminal device; or when there is a correspondence between the second user plane tunnel and the service identity of the terminal device, a protocol header that carries the first message does not include the service identity of the terminal device. In this case, a data amount of the protocol header that carries the first message may be correspondingly reduced. Therefore, air interface overheads are relatively small.

In an embodiment of the application, the multicasting, by the first radio access network device, the first message through a first air interface includes: determining, by the first radio access network device, a group identity of the first message; and multicasting, by the first radio access network device, the first message through the first air interface based on the group identity of the first message.

In an embodiment, the group identity in the first message is determined in the following manner: When a protocol header that carries the first message includes the group identity, the first radio access network device obtains the group identity based on the protocol header that carries the first message; or when there is a correspondence between the second radio bearer and the group identity of the terminal device, a protocol header that carries the first message does not include the group identity of the terminal device, and the first radio access network device determines the group identity based on the second radio bearer; or when there is a correspondence between the second user plane tunnel and the group identity of the terminal device, a protocol header that carries the first message does not include the group identity of the terminal device, and the first radio access network device determines the group identity based on the second user plane tunnel.

In an embodiment of the application, the multicasting, by the first radio access network device, the first message through a first air interface includes: multicasting, by the first radio access network device, a first notification message, where the first notification message includes the group identity of the first message; and triggering, by the first radio access network device, multicast of the first message through the first air interface when receiving a first feedback message from a terminal device within a management range of the first radio access network device, where the first feedback message includes the group identity of the first message; or multicasting, by the first radio access network device, a second notification message, where the second notification message includes the group identity of the first message and configuration information that is of a preamble and that corresponds to the group identity; and triggering, by the first radio access network device, multicast of the first message through the first air interface when receiving a second feedback message from a terminal device within a management range of the first radio access network device, where the second feedback message includes a preamble, and the preamble is determined based on the configuration information of the preamble.

In an embodiment of the application, when the first radio access network device receives the feedback message of the terminal device in the management range of the first radio access network device, that is, when the terminal device in the management range of the first radio access network device is interested in the first message, the first radio access network device triggers multicast of the first message. Compared with that multicast is directly triggered regardless of whether the terminal device in the management range of the first radio access network device is interested in the first message after receiving the first message, this can reduce unnecessary network overheads.

In an embodiment, the application provides a communication method, including: generating, by a terminal device, a first message; and sending, by the terminal device, the first message to a first radio access network device on a radio bearer, where the radio bearer is used by the first radio access network device to directly multicast the first message through a first air interface when the first radio access network device receives the first message, and the first air interface is an air interface for communication between the first radio access network device and a terminal device within a management range of the first radio access network device.

In an embodiment of the application, the radio bearer is a first radio bearer; and the sending, by the terminal device, the first message to a first radio access network device on a radio bearer includes: sending, by the terminal device, the first message to the first radio access network device on the first radio bearer, where the first radio bearer is used to transmit a first message that meets a first condition, and the first condition is: the first message is transmitted on the first radio bearer and directly multicast through the first air interface.

In another embodiment of the application, the radio bearer is a second radio bearer; and the sending, by the terminal device, the first message to a first radio access network device on a radio bearer includes: sending, by the terminal device, the first message to the first radio access network device on the second radio bearer, where the second radio bearer is used to transmit a first message that meets a second condition, there is a correspondence between the second radio bearer and one or more of a group identity of the terminal device, a service identity of the terminal device, or a quality of service QoS parameter of the first message, and the second condition is: the first message is transmitted on the second radio bearer and is directly multicast through the first air interface.

In still another embodiment of the application, the radio bearer is a third radio bearer, and the sending, by the terminal device, the first message to a first radio access network device on a radio bearer includes: sending, by the terminal device, the first message to the first radio access network device on the third radio bearer, where the third radio bearer is used to transmit a first message that meets a third condition or a fourth condition, the third condition is: the first message is transmitted on the third radio bearer and is directly multicast through the first air interface, and the fourth condition is: the first message is transmitted on the third radio bearer and the first message is reported to a core network element; and the first message carries a first indication, and the first indication is used to indicate the first radio access network device to directly multicast the first message through the first air interface when the first radio access network device receives the first message.

In an embodiment of the application, the radio bearer is a fourth radio bearer; and the sending, by the terminal device, the first message to a first radio access network device on a radio bearer includes: sending, by the terminal device, the first message to the first radio access network device on the fourth radio bearer, where the fourth radio bearer is used to transmit a first message that meets a fifth condition or a sixth condition, the fifth condition is: the first message is transmitted on the fourth radio bearer and is directly multicast through the first air interface, and the sixth condition is: the first message is transmitted on the fourth radio bearer and the first message is reported to a core network element; and the first message carries a QoS parameter.

In an embodiment, when there is a correspondence between the second radio bearer and the group identity of the terminal device, the protocol header that carries the first message does not include the group identity of the terminal device; or when there is a correspondence between the second radio bearer and the service identity of the terminal device, the protocol header that carries the first message does not include the service identity of the terminal device.

In an embodiment, for beneficial effects of the first radio bearer, the second radio bearer, the third radio bearer, and the fourth radio bearer, refer to the descriptions in the application. Details are not described herein again.

In an embodiment, the application provides a communication method, including: generating, by a second radio access network device, a first message; and sending, by the second radio access network device, the first message to a first radio access network device through a user plane tunnel, where the user plane tunnel is used by the first radio access network device to multicast the first message through a first air interface when the first radio access network device receives the first message, and the first air interface is an air interface for communication between the first radio access network device and a terminal device within a management range of the first radio access network device.

In an embodiment of the application, the user plane tunnel is a first user plane tunnel, and the sending, by the second radio access network device, the first message to a first radio access network device through a user plane tunnel includes: sending, by the second radio access network device, the first message to the first radio access network device through the first user plane tunnel, where the first user plane tunnel is configured to forward a first message that meets a seventh condition, and the seventh condition is: the first message is forwarded through the first user plane tunnel and is directly multicast through the first air interface.

In another embodiment of the application, the user plane tunnel is a second user plane tunnel, and the sending, by the second radio access network device, the first message to a first radio access network device through a user plane tunnel includes: sending, by the second radio access network device, the first message to the first radio access network device through the second user plane tunnel, where the second user plane tunnel is configured to forward a first message that meets an eighth condition, there is a correspondence between the second user plane tunnel and one or more of a group identity of the terminal device, a service identity of the terminal device, and a QoS parameter of the first message, and the eighth condition is: the first message is forwarded through the second user plane tunnel and is directly multicast through the first air interface.

In an embodiment, when there is a correspondence between the second user plane tunnel and the group identity of the terminal device, a protocol header that carries the first message does not include the group identity of the terminal device; or when there is a correspondence between the second user plane tunnel and the service identity of the terminal device, a protocol header that carries the first message does not include the service identity of the terminal device. For beneficial effects of the first user plane tunnel and the second user plane tunnel, refer to the descriptions in the application. Details are not described herein again.

In an embodiment, the application provides a communications apparatus. The communications apparatus is applied to a first radio access network device and includes units configured or means used to perform the operations as described herein.

In an embodiment, the application provides a communications apparatus. The communications apparatus is applied to a terminal device and includes units configured or means used to perform the operations as described herein.

In an embodiment, the application provides a communications apparatus. The communications apparatus is applied to a second radio access network and includes units configured or means used to perform the operations as described herein.

In an embodiment, the application provides a communications apparatus. The communications apparatus is applied to a first radio access network device and includes at least one processing element and at least one storage element, where the at least one storage element is configured to store a program and/or data, and the at least one processing element is configured to perform the method provided in the application.

In an embodiment, the application provides a communications apparatus. The communications apparatus is applied to a terminal device and includes at least one processing element and/or at least one storage element, where the at least one storage element is configured to store a program and/or data, and the at least one processing element is configured to perform the method provided in the application.

In an embodiment, the application provides a communications apparatus. The communications apparatus is applied to a second radio access network device and includes at least one processing element and/or at least one storage element, where the at least one storage element is configured to store a program and/or data, and the at least one processing element is configured to perform the method provided in the application.

In an embodiment, the application provides a communications apparatus. The communications apparatus is applied to a first radio access network device and includes at least one processing element (or chip) configured to perform the method as described herein.

In an embodiment, the application provides a communications apparatus. The communications apparatus is applied to a terminal device and includes at least one processing element (or chip) configured to perform the method as described herein.

In an embodiment, the application provides a communications apparatus. The communications apparatus is applied to a second radio access network device and includes at least one processing element (or chip) configured to perform the method as described herein.

In an embodiment, the application provides a program. The program is configured to perform the method in any one of the foregoing embodiments when being executed by a processor.

In an embodiment, the application provides a program product, for example, a computer-readable storage medium, including a program in any one of the foregoing embodiments.

An embodiment of the application provides a communications system. The communications system includes the first radio access network device, and/or the terminal device, and/or the second radio access network device, as described herein.

DESCRIPTION OF EMBODIMENTS

Figure 1:
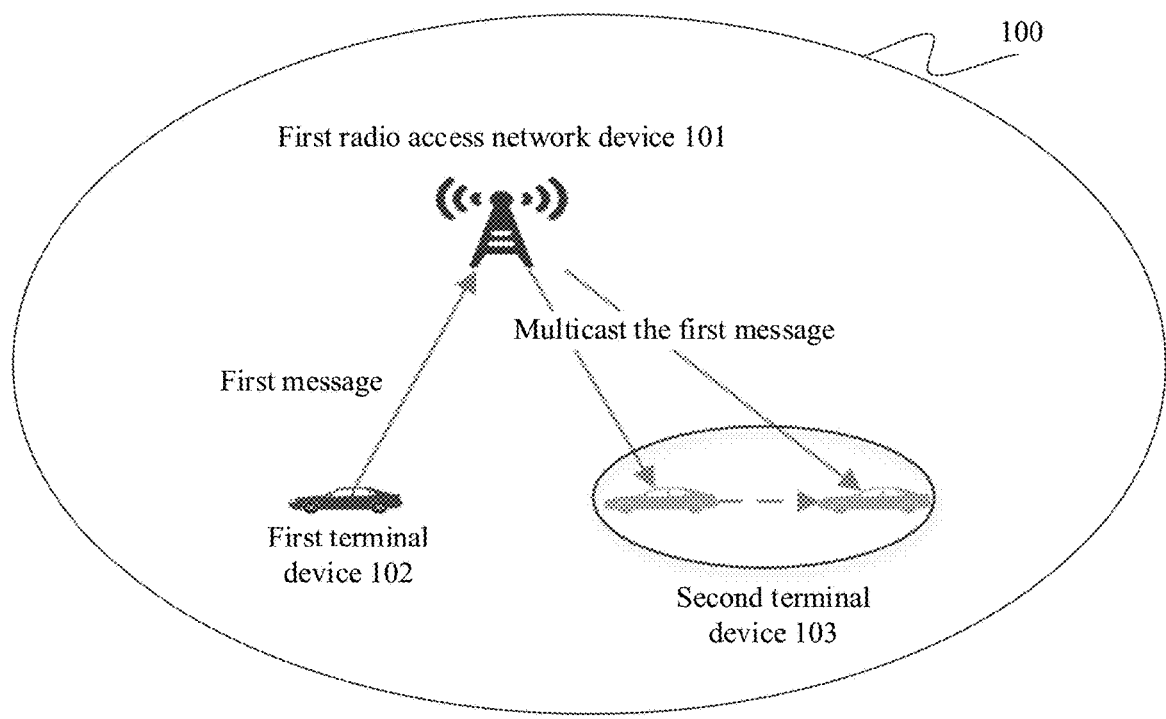
FIG. 1 shows a possible communications system according to an embodiment of the application.

Embodiments of the application provide a communication method and a communications apparatus, to reduce a transmission delay of a multicast message.

The following explains and describes some terms in the application, to facilitate understanding by one of ordinary skill in the art.

(1) A communications system may be various radio access technology (RAT) systems, for example, a code division multiple access (CDMA) system, a time division multiple access (TDMA) system, a frequency division multiple access (FDMA) system, an orthogonal frequency division multiple access (OFDMA) system, a single-carrier frequency division multiple access (SC-FDMA) system, and another system. The terms "system" and "network" can be interchanged with each other. The CDMA system may implement radio technologies such as universal terrestrial radio access (UTRA) and CDMA2000. UTRA may include a wideband CDMA (WCDMA) technology and another technology transformed from CDMA. CDMA2000 may cover interim standard (IS) 2000 (IS-2000), IS-95, and IS-856. The TDMA system can implement a wireless technology such as a global system for mobile communications (GSM). The OFDMA system can implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. UTRA corresponds to UMTS, and E-UTRA corresponds to an evolved version of UMTS. A new version of UMTS, namely, E-UTRA, is used in 3GPP long term evolution (LTE) and various versions evolved based on LTE. In addition, the communications system may be further applicable to a future-oriented communications technology. Any communications system that uses a new communications technology, including cellular communication and D2D communication, is applicable to the technical solutions provided in embodiments of the invention. A system architecture and a service scenario that are described in embodiments of the invention are intended to describe the technical solutions in embodiments of the invention more clearly, and do not constitute a limitation on the technical solutions provided in embodiments of the invention. One of ordinary skill in the art may know that: With evolution of network architectures and emergence of new service scenarios, the technical solutions provided in embodiments of the invention are also applicable to similar technical problems.

Generally, a conventional communications system supports a limited quantity of connections and is easy to implement. However, with development of communications technologies, a mobile communications system not only supports conventional communication, but also supports, for example, device-to-device (D2D) communication, machine to machine (M2M) communication, machine type communication (MTC), and vehicle to everything (V2X) communication, for example, vehicle to vehicle (V2V) communication, vehicle to infrastructure (V2I) communication, vehicle to pedestrian (V2P) communication, and vehicle to network (V2N) communication.

(2) A radio access network device includes an access network/radio access network (Radio Access Network, RAN) device. In a network including a plurality of 5G-RAN nodes, the 5G-RAN node may be an access point (AP), a next-generation new base station (NR nodeB, gNB), a next-generation evolved base station (ng-eNB, gNB), a transmission reception point (TRP), a transmission point (TP), or another access node. The 5G-RAN node may be further divided into a central unit (CU) and a distributed unit (DU) inside the node.

In addition, the access network device may alternatively be a base transceiver station (Base Transceiver Station, BTS) in GSM or CDMA, or may be a NodeB (NB) in WCDMA, or may be an evolved NodeB (Evolutional Node B, eNB or eNodeB) in LTE, or a relay station or an access point, or a vehicle-mounted device, a wearable device, an access network device in a future 5G network, an access network device in a future evolved PLMN network, or the like. This is not particularly limited in the application.

It may be understood that, in embodiments of the application, the access network device may provide a service for a cell, and a terminal device communicates with the access network device by using a transmission resource (for example, a frequency domain resource or a spectrum resource) used by the cell. The cell may be a cell corresponding to the access network device (for example, a base station). The cell may belong to a macro base station or a base station corresponding to a small cell. The small cell herein may include a metro cell, a micro cell, a pico cell, a femto cell, or the like. These small cells feature small coverage and low transmit power, and are suitable for providing a high-rate data transmission service.

In addition, a plurality of cells may simultaneously work on a same frequency on a carrier in an LTE system or a 5G system. In some special scenarios, it may be considered that a concept of the carrier is equivalent to a concept of the cell. For example, in a carrier aggregation (CA) scenario, when a secondary carrier is configured for UE, both a carrier index of the secondary carrier and a cell identity (Cell ID) of a secondary cell working on the secondary carrier are carried. In this case, it may be considered that the concept of the carrier is equivalent to the concept of the cell. For example, that the UE accesses a carrier is equivalent to that the UE accesses a cell.

(3) Terminal device, which may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, a user apparatus, or the like. The terminal device may be a station (ST) in WLAN, may be a cellular phone, a cordless phone, a session initiation protocol (Session Initiation Protocol, SIP) phone, a wireless local loop (WLL) station, a personal digital assistant (PDA) device, a handheld device having a wireless communication function, a computing device, another processing device connected to a wireless modem, a vehicle-mounted device, an internet of vehicles terminal, a computer, a laptop computer, a handheld communications device, a handheld computing device, a satellite wireless device, a wireless modem card, a set top box (STB), customer premise equipment (CPE) and/or another device configured to perform communication in a wireless system, and a terminal device in a next-generation communications system, for example, a terminal device in a 5G network, a terminal device in a future evolved public land mobile network (PLMN), or the like.

By way of example and not limitation, in embodiments of the application, the terminal device may alternatively be a terminal device in an internet of things (IoT) system, for example, a vehicle in the internet of vehicles.

In addition, it should be understood that in descriptions of the application, terms such as "first" and "second" are merely used for differentiation and description, but should not be understood as an indication or implication of relative importance or an indication or implication of an order.

The following describes the technical solutions in embodiments of the application with reference to the accompanying drawings in the embodiments of the application.

FIG. 1 shows a possible communications system 100 according to an embodiment of the application. The communications system 100 includes a first radio access network device 101, a first terminal device 102, and a second terminal device 103.

The first terminal device 102 may send a first message on a radio bearer, where the radio bearer is a bearer between the first radio access network device 101 and the first terminal device 102. After receiving the first message, the first radio access network device 101 may directly multicast the first message through a first air interface, where the first air interface is an air interface through which the first radio access network device communicates with a terminal device within a management range of the first radio access network device. For example, the first air interface may be an LTE air interface for communication between an LTE base station and a terminal device in an LTE system, or may be an NR air interface for communication between an NR base station and a terminal device in a 5G NR system.

In an embodiment of the application, the second terminal device 103 located in the management range of the first radio access network device 101 may directly receive the first message, or the second terminal device 103 may choose whether to receive the first message. For example, the second terminal device 103 may first determine whether the second terminal device 103 is interested in the first message. If the second terminal device 103 is interested in the first message, the second terminal device 103 may select to receive the first message; or if the second terminal device 103 is not interested in the first message, the second terminal device 103 may select not to receive the first message. A criterion for determining that the second terminal device 103 is interested in the first message may be as follows: The second terminal device 103 and the first terminal device 102 have a same service type, or the second terminal device 103 and the first terminal device 102 belong to one group, or the second terminal device 103 and the first terminal device 102 are not correlated, and the second terminal device 103 only wants to receive the first message.

In an embodiment, the second terminal device 103 may first obtain a group identity corresponding to the first message, and then determine, based on the group identity, whether the second terminal device 103 is interested in the first message. For obtaining, by the second terminal device 103, the group identity corresponding to the first message, the application provides the following three possibilities:

A first possibility is that the second terminal device 103 determines, based on a multicast data channel for multicasting the first message and with reference to a previous correspondence that is broadcast/multicast by the first radio access device 101 and that is between a group identity and the multicast data channel, the group identity corresponding to the multicast data channel. The multicast data information may include, for example, a periodicity, duration, an offset, a start frame number, a start subframe number, and the like.

A second possibility is that the second terminal device 103 may determine, based on a RAN-side group identity carried when the first radio access device 101 multicasts the first message and with reference to a previous correspondence that is broadcast/multicast by the first radio access device 101 and that is between a group identity and the RAN-side group identity, the group identity corresponding to the RAN-side group identity.

A third possibility is that the second terminal device 103 may determine, based on a logical channel identifier carried when the first radio access device 101 multicasts the first message and with reference to a previous correspondence that is broadcast/multicast by the first radio access device and that is between a group identity and the logical channel identifier, the group identity corresponding to the logical channel identifier.

It can be learned from the foregoing that, in an embodiment of the application, when receiving the first message, the first radio access network device 101 directly multicasts the first message through an air interface. Compared with that in the prior art, when receiving the first message, the first radio access network device 101 reports the first message to a core network element, and then the core network element determines whether to enable the first radio access network device 101 to multicast the first message, this can reduce a transmission delay of a multicast message.

It may be understood that, in an embodiment of the application, in the architectural diagram of the communications system shown in FIG. 1, an example in which there are two second terminal devices 103 in the management range of the first radio access network device 101 is used for description. In an embodiment of the application, a quantity of second terminal devices 103 is not limited to 2. In addition, in the foregoing embodiment, the first terminal device 102 sends the first message, and then the second radio access network device 101 multicasts the first message, so that the second terminal device 103 can receive the first message. In an embodiment of the application, alternatively, one of the second terminal devices 103 may report the first message to the first radio access network device 101, and then the first radio access network device 101 multicasts the first message, so that the first terminal device 102 can receive the first message. In addition, in the communications system shown in FIG. 1, an example in which the terminal device is a transportation means, namely, a vehicle, is used for description. In an embodiment of the application, the terminal device is not limited to being the transportation means, namely, the vehicle, and may be a mobile phone, a wearable device, or the like. For an explanation and description, refer to the description of the terminal device in (3).

In an embodiment, there may be the following several cases to describe how the first terminal device 102 sends the first message to the first radio access network device 101 on the radio bearer.

Case 1: A first radio bearer is set up between the first radio access network device 101 and the first terminal device 102, the first radio bearer is used to transmit a first message that meets a first condition, and the first condition is: the first message is transmitted on the first radio bearer and is directly multicast through the first air interface. The first radio bearer may be referred to as a direct forwarding bearer, for example, a Direct-RB. The first radio bearer includes only an air interface between the first terminal device 102 and the first radio access network device 101, and the first radio bearer does not include a corresponding tunnel between the first radio access network device and a core network. In an embodiment of the application, the first radio bearer may be used to transmit all first messages that meet the first condition, and regardless of a service type, a group, or a quality of service (QoS) parameter to which the first messages belong, the first messages may be transmitted on the first radio bearer.

In an embodiment of the application, the first radio bearer may be set up between the first radio access network device 101 and the first terminal device 102 in the following manner: After the first terminal device 102 establishes a radio resource control (RRC) connection to the first radio access network device 101, the first radio access network device 101 may provide a configuration message of the first radio bearer in an RRC reconfiguration message, including but not limited to an identifier of the first radio bearer, a direct multicast indication, and configuration information of a packet data convergence protocol (PDCP) layer/radio link control (RLC) protocol layer/media access control (MAC) layer/physical layer protocol (PHY) layer or another layer. The direct multicast indication may be an explicit 1-bit indication, or may be an implicit indication. An example of the implicit indication is that direct forwarding can be indicated by naming a set-up radio bearer Direct-RB.

In another embodiment of the application, the first terminal device 102 may request the first radio access network device 101 to set up the first radio bearer, where the request may include an identifier of the first radio bearer, a direct multicast indication, a QoS requirement, and the like; or the first terminal device 102 may report a capability about whether the first terminal device 102 supports direct multicast bearing and/or V2X message uploading, and the first radio access network device 101 may determine, based on the capability reported by the first terminal device 102, whether to configure the first radio bearer for the first terminal device 102. For example, when the first terminal device 102 supports the capability of the direct multicast bearing and/or the V2X message uploading, the first radio access network device 101 may configure the first radio bearer for the first terminal device 102; otherwise, the first radio access network device 101 does not configure the first radio bearer for the first terminal device 102.

Optionally, in the foregoing embodiment, when the first radio bearer is referred to as a direct-radio bearer (RB), the identifier of the first radio bearer may be referred to as a DRB identifier, and the direct multicast indication may be referred to as a Direct-RB indication.

Case 2: A second radio bearer is set up between the first radio access network device 101 and the first terminal device 102, the second radio bearer is used to transmit a first message that meets a second condition, there is a correspondence between the second radio bearer and one or more of a group identity of the terminal device, a service identity of the terminal device, and a quality of service QoS parameter of the first message, and the second condition is: the first message is transmitted on the second radio bearer, and is directly multicast through the first air interface.

In an embodiment of the application, second radio bearers may be in a one-to-one correspondence with group identities of the terminal devices 102. Before the first terminal device 102 sends the first message to the first radio access network device 101, the first terminal device 102 may report group information of a group in which the first terminal device 102 is located to the first radio access network device 101 in advance, where the group information may include the group identity, the group information may further include other information, and the other information includes one or more of a quantity of group members, a speed, braking, acceleration, a planned route, an inter-vehicle distance, and the like.

In an embodiment of the application, a protocol header that carries the first message may include one or more of a group identity, a service identity, and a QoS parameter. However, it can be learned from the foregoing description that the second radio bearer may have a correspondence with one or more of the group identity, the service identity, and the QoS parameter. In an embodiment of the application, when there is a correspondence between the second radio bearer and the group identity, the protocol header that carries the first message may not include the group identity. In other words, for example, terminal devices are grouped in advance into a first group, a second group, a third group, and the like, and it is set that there is a correspondence between the second radio bearer and the first group. In this case, when a terminal device in the first group sends a first message, a protocol header that carries the first message may not carry a group identity of the terminal device, that is, an identity of the first group. Similarly, when there is a correspondence between the second radio bearer and the service identity, a protocol header that carries the first message may not include the service identity. For example, when there is a correspondence between the second radio bearer and a first service, when sending a first message, a terminal device that supports a first service may exclude an identity of the first service from a protocol header that carries the first message.

Case 3: A third radio bearer that is already set up between the first radio access network device 101 and the first terminal device 102 is used, the third radio bearer is used to transmit a first message that meets a third condition or a fourth condition, the third condition is: the first message is transmitted on the third radio bearer and is directly multicast through the first air interface, and the fourth condition is: the first message is transmitted on the third radio bearer, and the first message is reported to a core network element. That is, the third radio bearer supports both transmission of conventional service data to be sent to a core network and/or service data to be directly multicast.

When the first message sent by the first terminal device 102 carries a first indication, the first radio access network device 101 multicasts the first message through the first air interface; otherwise, the first radio access network device 101 reports the first message to the core network element. The first indication is used to indicate the first radio access network device to directly multicast the first message through the first air interface when the first radio access network device receives the first message.

In an embodiment of the application, the third radio bearer may be an existing radio bearer between the first radio access network device 101 and the first terminal device 102, and the first indication may be carried on an L2 protocol layer, namely, a PDCP/RLC/MAC/PHY layer, of the third radio bearer (for example, the first indication is carried by using a MAC CE or a MAC subheader). Alternatively, an adaptation layer may be newly added to the third radio bearer, and for example, an adaptation layer is newly added between the PDCP layer and the RLC layer, or an adaptation layer is newly added between an SDAP layer and the PDCP layer; and then the first indication is carried on the newly added adaptation layer. Alternatively, the first terminal device 102 may send uplink control information (UCI) to the first radio access network device, where the UCI carries the first indication.

In an embodiment of the application, a server or a radio access network (RAN) may notify the first terminal device 102 of a direct multicast rule of the first radio access network device 101 in advance. For example, a QoS parameter is greater than a first value, or a first message whose message type is a first type is reported to the core network element, and the QoS parameter is less than or equal to the first value, or a first message whose message type is a second type may be directly multicast through the first radio access network device 101. The QoS parameter may include one or more of a proximity service per packet priority (ProSe per Packet Priority, PPPP) parameter, a proximity service per packet reliability (ProSe per Packet Reliability, PPPR) parameter, and a 5G QoS identifier (5QI).

In another embodiment of the application, a direct multicast rule of the first radio access network device 101 may be specified in a protocol, or a server or a core network element may notify the first terminal device 102 of a direct multicast rule through the first radio access network device 101, or the first radio access network device may configure a direct multicast rule for the first terminal device 102 by using a broadcast message or an RRC message. For example, the first radio access network device 101 may directly multicast a first message that has a higher requirement on a delay, and the first radio access network device 101 may report a first message that has a lower requirement on a delay to the core network element.

In still another embodiment of the application, the first terminal device 102 may request to use an existing radio bearer to send the first message to the first radio access network device 101 for direct multicast. A request message sent by the first terminal device 102 may include one or more of a DRB identifier, a direct multicast indication of the first radio access network device 101, a start time of direct multicast, an end time of the direct multicast, and direct multicast duration. If the request message is an existing message, the request message needs to include the direct multicast indication of the first radio access network device. If the request message is a newly defined message, the message type may represent the direct multicast indication of the first radio access network device 101. When the first radio access network device 101 receives the request message, the first radio access network device may send an acknowledgment message. The acknowledgment message may include one or more of a determining indication, the DRB ID, and the direct multicast duration. When the first radio access network device provides the multicast duration, the UE may start a timer, and set timing duration. Before the timing duration of the timer ends, the first terminal device 102 may use the third radio bearer to directly perform multicast.

Case 4: A fourth radio bearer that is already set up between the first radio access network device 101 and the first terminal device 102 is used, the fourth radio bearer is used to transmit a first message that meets a fifth condition or a sixth condition, the fifth condition is: the first message is transmitted on the fourth radio bearer and is directly multicast through the first air interface, and the sixth condition is: the first message is transmitted on the fourth radio bearer, and the first message is reported to a core network element.

When a QoS parameter carried in the first message meets a predetermined condition, the first radio access network device 101 multicasts the first message through the first air interface; otherwise, the first radio access network device 101 reports the first message to a core network element. For example, when a QoS parameter carried in the first message is greater than a first value, it may be considered that the QoS parameter meets the foregoing preset condition. When the QoS parameter carried in the first message is less than or equal to the first value, it may be considered that the QoS parameter does not meet the foregoing preset condition.

In an embodiment, the first terminal device 102 may include a QoS parameter in an L2 protocol layer or a newly added adaptation layer of the first message, and the first radio access network device 101 may determine, based on the QoS parameter, to directly multicast the first message through the first air interface or report the first message to the core network element. The L2 protocol layer may be an RLC layer, a MAC layer, or a PHY layer. The newly added adaptation layer may be disposed between a PDCP layer and the RLC layer, or the newly added adaptation layer may be disposed between an SDAP layer and a PDCP layer. In another embodiment, there is a mapping relationship between the fourth bearer and the QoS parameter, and the first radio access network device 101 determines, based on the mapping relationship between the fourth bearer and the QoS parameter, whether to perform direct forwarding.

In another embodiment, fourth radio bearers are in a one-to-one correspondence with QoS parameters. That is, there are a plurality of fourth radio bearers, and the fourth radio bearers are in a one-to-one correspondence with specific QoS parameters. When the QoS parameter corresponding to the fourth radio bearer meets the preset condition, the first radio access network device 101 may alternatively determine, depending on whether the first message carries a group identity or a V2X indication, whether to perform direct forwarding. For example, when the first message carries the group identity or the V2X indication, the first radio access network device determines to directly forward the first message.

Optionally, in an embodiment of the application, if the first radio access network device 101 supports both a unicast manner and a multicast manner when directly forwarding the first message, the first terminal device 102 may include a unicast indication or a multicast indication in the first message, to prevent a case in which the first radio access network device cannot determine, based on a destination address of the first message, that the first message needs to be unicast or the first message needs to be multicast. The unicast or multicast indication may be carried on an L2 protocol layer (where for example, the indication is carried in a MAC CE or a MAC subheader) or an adaptation layer, or is carried in UCI sent by the first terminal device 102.

The following part describes in detail how the first radio access network device 101 multicasts the first message through the first air interface. When the solution provided in an embodiment of the application is applied to a V2X field, the first message may also be referred to as a group call message.

In an embodiment, the first radio access network device 101 may first determine the group identity of the first message, and then multicast the first message through the first air interface based on the group identity of the first message.

The first radio access network device 101 may determine the group identity of the first message in the following two manners. In a first manner, if a protocol header that carries the first message and that is reported by the first terminal device 102 includes a group identity of the first terminal device, the first radio access network device 101 may determine the group identity based on the protocol header that carries the first message. In a second manner, it can be learned from the foregoing description that, for the second radio bearer, a correspondence between the second radio bearer and the group identity may be established. If the set-up second radio bearer has the correspondence with the group identity, the first radio access network device 101 may determine the group identity of the first message by using the second radio bearer, and the group identity of the first message does not need to be carried in the protocol header that carries the first message, thereby reducing network overheads.

In the first manner, the first terminal device 102 may directly include the group identity in an L2 protocol stack of the first message, and may further include a QoS parameter, a message type, a propagation range, and the like in the L2 protocol stack. The group identity may be a proximity service layer 2 group identity (proSe layer 2 group ID), a destination layer 2 identity (destination layer 2 ID), a vehicle fleet platoon group identity, a multimedia broadcast and multicast service session (MBMS session) identity, a temporary mobile group identity (TMGI), or another identity. Particularly, there is a mapping relationship between the MBMS session identity/TMGI and a service. Particularly, the group identity may also be a RAN-side identity. The RAN-side identity is a corresponding RAN-side identity allocated by the first radio access network device 101 to the group identity when the first radio access network device 101 receives the group identity of the first terminal device 102. The RAN-side identity corresponds to the group identity. A quantity of bits occupied by the RAN-side identity is relatively small, so that air interface overheads are relatively small. For example, a RAN-side identity 01 may be used to represent a group identity Destination Layer 2 ID 1, and a RAN-side identity 10 is used to represent a Destination Layer 2 ID 2.

For the second manner, the first terminal device 102 may report group information of a group in which the first terminal device 102 is located to the first radio access network device 101 in advance, where the group information includes the group identity. In addition to the group identity, the group information may further include other information, for example, one or more of a quantity of group members, a speed, braking, acceleration, a planned route, an inter-vehicle distance, and the like. A radio bearer may be set up between the first radio access network device 101 and the first terminal device 102. For example, a logical channel identifier 1 and a data radio bearer identifier DRB ID=1 may be allocated to a group 1. Then, the radio access network device 101 may learn of a corresponding group identity by using the bearer identifier (DRB ID) or the logical channel identifier (LCID).

In an embodiment of the application, the first radio access network device 101 may directly multicast the first message after receiving the first message sent by the first terminal device 102. In this manner, a procedure is simple and efficiency of triggering multicast is relatively high.

In another embodiment of the application, after or before receiving the first message sent by the first terminal device 102, the first radio access network device 101 may send a notification message within a management range of the first radio access network device 101. The second terminal device 103 may determine, based on the notification message, whether the second terminal device 103 is interested in the first message, and if the second terminal device 103 is interested in the first message, the first radio access network device 101 multicasts the first message through the first air interface. Alternatively, the second terminal device 103 reports a group identity that the second terminal device 103 is interested in, so that the first radio access network device 101 determines whether to multicast the first message. In this manner, when the second terminal device 103 in the management range of the first radio access network device 101 is not interested in the first message, the first radio access network device 101 does not trigger multicast of the first message, thereby reducing air interface overheads. In the application, how the first radio access network device 101 sends the notification message may be discussed in the following two manners:

In a first manner, after or before receiving the first message sent by the first terminal device 102, the first radio access network device 101 may multicast a first notification message, where the first notification message may include the group identity of the first message. If the second terminal device 103 is interested in the group identity of the first message, the second terminal device 103 may send a first feedback message to the first radio access network device 101. When receiving the first feedback message, the first radio access network device 101 triggers multicast of the first message; otherwise, the first radio access network device 101 does not trigger multicast of the first message. The first feedback message includes the group identity of the first message.

In a second manner, after or before receiving the first message sent by the first terminal device 102, the first radio access network device 101 may multicast a second notification message, where the second notification message includes the group identity of the first message and configuration information that is of a preamble and that corresponds to the group identity. If the second terminal device 103 is interested in the group identity of the first message, the second terminal device 103 may send a second feedback message to the first radio access network device 101. When receiving the second feedback message, the first radio access network device 101 triggers multicast of the first message; otherwise, the first radio access network device 101 does not trigger multicast of the first message. The second feedback message includes a preamble, and the preamble is determined based on configuration information of the preamble. The first access network device 101 determines, based on the preamble and a correspondence between a group identity and the preamble, whether to multicast the first message.

An application scenario of the first manner and/or the second manner is as follows: The first terminal device 102 is set to be located in a first group, and the first radio access network device 101 may determine a quantity of terminal devices that are in an active state and that belong to the first group in the management range of the first radio access network device 101, where the quantity may be referred to as a first quantity. Then, the first radio access network device 101 determines an actual quantity of terminal devices in the first group, which may be referred to as a second quantity. The first radio access network device 101 determines whether the first quantity is equal to the second quantity. If the first quantity is equal to the second quantity, multicast of the first message may be triggered. If the first quantity is not equal to the second quantity, the first radio access network device 101 may determine, based on a feedback of the terminal device, whether to trigger multicast. For how to trigger the multicast based on the feedback of the terminal device, refer to the description of the first manner and/or the second manner. This is not described herein again.

In an embodiment of the application, for how the first radio access network device 101 determines the first quantity and/or the second quantity, the following manner may be used: All terminal devices in the first group may report all group identities, quantities of group members, other information (e.g., a speed, braking, acceleration, a planned route, and an inter-distance), and proximity service (ProSe) layer 2 IDs to the first radio access network device 101. Alternatively, a lead vehicle reports a group identity of a group in which the lead vehicle is located, a quantity of group members, and other information to the first radio access network device 101, and other members report only group identities to a base station. Alternatively, a multicast server may notify the first radio access network device 101 (for example, may perform forwarding through a core network) of the group identities and the group information, or a core network element notifies the first radio access network device 101 of a group identity and group information that are of the group in which the first terminal device 102 is located. When the application is applied to the V2X field, the multicast server may be a V2X APP server, a V2X function, or the like. The first radio access network device 101 may determine the quantity of all the terminal devices in the first group, namely, the second quantity, based on the reported group identities. In an, the terminal devices in the active state may periodically report group identities to the first radio access network device 101, and then the first radio access network device 101 may determine, based on reporting statuses of the terminal devices, a quantity of the terminal devices in the active state, namely, the first quantity.

In an embodiment of the application, for example, UE 1 reports a group identity of a group in which the UE 1 is located, namely, a Destination L2 ID 1, to the first radio access network device 101, and there are a total of five members in the group. UE 2 reports a group identity of a group in which the UE 2 is located, namely, the Destination L2 ID 1, to the first radio access network device 101. The first radio access network device 1011 learns that there are two members in the group corresponding to the Destination L2 ID 1 in the management range of the first radio access network device 101, but actually there are five members in the group. The first radio access network device 101 may infer that another member in the group may be in an idle state or an inactive state on a base station 1, or may move to a coverage area of another base station. In this case, the first radio access network device needs to determine, based on a feedback status of the UE, whether to trigger multicast.

Figure 2:
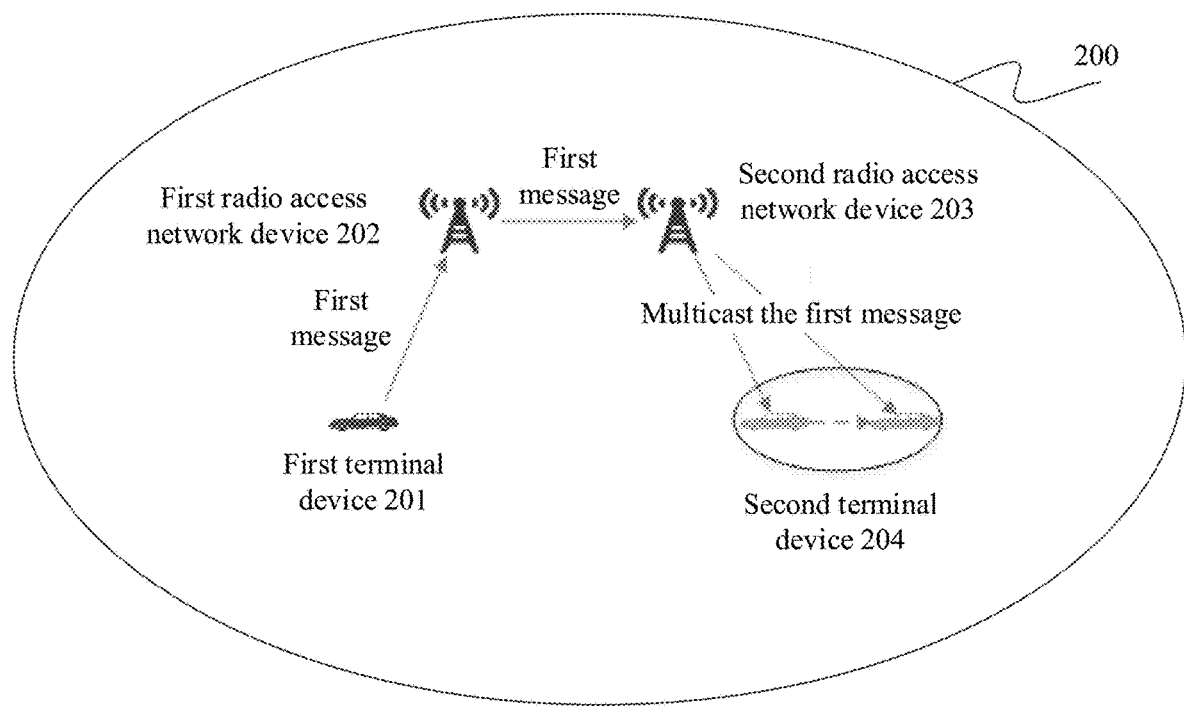
FIG. 2 shows another possible communications system according to an embodiment of the application.

FIG. 2 shows a possible communications system 200 according to an embodiment of the application. The communications system 200 may include a first terminal device 201, a first radio access network device 202, a second radio access network device 203, and a second terminal device 204.

The first terminal device 201 may send a first message to the first radio access network device 202 on a radio bearer. In addition, the first radio access network device 202 may forward the first message to the second radio access network device 203 through a user plane tunnel, and the second radio access network device 203 may multicast the first message through a first air interface, so that the second terminal device 204 within a management range of the second radio access network device 203 can receive the first message.

In an embodiment of the application, the first radio access network device 202 and the second radio access network device 203 may be adjacent radio access network devices, and an interface between the first radio access network device 202 and the second radio access network device 203 may be an X2 interface, an Xn interface, or another interface between radio access network devices.

In an embodiment of the application, an entire working process of the communications system 200 shown in FIG. 2 may be as follows: The first terminal device 201 sends the first message to the first radio access network device 202, the first radio access network device 202 triggers multicast of the first message through the first air interface, to send or forward the first message to the second radio access network device 203, and the second radio access network device 203 triggers multicast of the first message through the first air interface.

In another embodiment of the application, an entire working process of the communications system 200 shown in FIG. 2 may be as follows: The first terminal device 201 sends the first message to the first radio access network device 202, the first radio access network device 202 forwards the first message to the second radio access network device 203, and the second radio access network device 203 triggers multicast of the first message through the first air interface.

It can be learned from the foregoing analysis that after receiving the first message, the first radio access network device 202 may perform the following two actions: triggering multicast of the first message through the first air interface, and forwarding the first message to the second radio access network device 203. After receiving the first message, the first radio access network device 202 may alternatively perform only the following one action, that is, forwarding the first message to the second radio access network device 203. Even after receiving the first message, the first radio access network device 202 may alternatively perform only an action of triggering multicast of the first message through the first air interface. This is not limited herein.

In an embodiment of the application, for a process in which the first terminal device 201 sends the first message to the first radio access network device 202 on the radio bearer, and a process in which the first radio access network device 202 and the second radio access network device 203 trigger multicast through the first air interface, refer to a record of the communications system shown in FIG. 1. In an embodiment of the application, the following mainly describes how the first radio access network device 202 forwards the first message to the second radio access network device 203. A detailed process may be described in the following two manners:

Manner 1: A first user plane tunnel is set up between the first radio access network device 202 and the second radio access network device 203, and the first radio access network device 202 may forward the first message to the second radio access network device 203 through the first user plane tunnel. The first user plane tunnel is used to forward a first message that meets a seventh condition, and the seventh condition is: the first message is forwarded through the first user plane tunnel and is directly multicast through the first air interface. In an embodiment, when receiving the first message through the first user plane tunnel, the second radio access network device 203 multicasts the first message through the first air interface.

Manner 2: A second user plane tunnel is set up between the first radio access network device 202 and the second radio access network device 203, and the first radio access network device 202 may send or forward the first message to the second radio access network device 203 through the second user plane tunnel. The second user plane tunnel is used to forward a first message that meets an eighth condition, and there is a correspondence between the second user plane tunnel and one or more of a group identity of the terminal device, a service identity of the terminal device, and a QoS parameter of the first message. The eighth condition is: the first message is forwarded or sent through the second user plane tunnel and is directly multicast through the first air interface. In an embodiment, the second user plane tunnel has two functions. A first function includes: when receiving the first message through the second user plane tunnel, the second radio access network device 203 directly performs multicast through the first air interface, and does not report the first message to a core network element, thereby reducing a delay. The second function includes: there may be a correspondence between the second user plane tunnel and one or more of the group identity, the service identity, and the QoS parameter. In addition, if there is a correspondence between the second user plane tunnel and the group identity, a protocol header that carries the first message may not include the group identity of the terminal device, and the second radio access network device 203 may determine the group identity of the first message by using the second user plane. In addition, if there is a correspondence between the second user plane tunnel and the service identity, the protocol header that carries the first message may not include the service identity.

It can be learned from the foregoing that in an embodiment of the application, after receiving the first message sent by the first radio access network device 202, the second radio access network device 203 does not report the first message to the core network element, but directly multicasts the first message through the first air interface, so that a transmission delay is relatively small.

It may be understood that the communications system shown in FIG. 2 may be used as an example of an application scenario of the application, and is not intended to limit the application. For example, in an application scenario of the application, the first radio access network device needs to trigger multicast of the first message. In this case, the first radio access network device may generate the first message, and then send the first message to the second radio access network device 203 through the user plane tunnel. When receiving the first message, the second radio access network device 203 triggers multicast of the first message. Further, in other words, a source of the first message is not limited in an embodiment of the application. The first message may be received by the first radio access network device 202 from a terminal device side, or may be generated by the first radio access network device 202, or may be received from the core network element, another server, or another radio access network device. This is not limited in the application.

Figure 3:
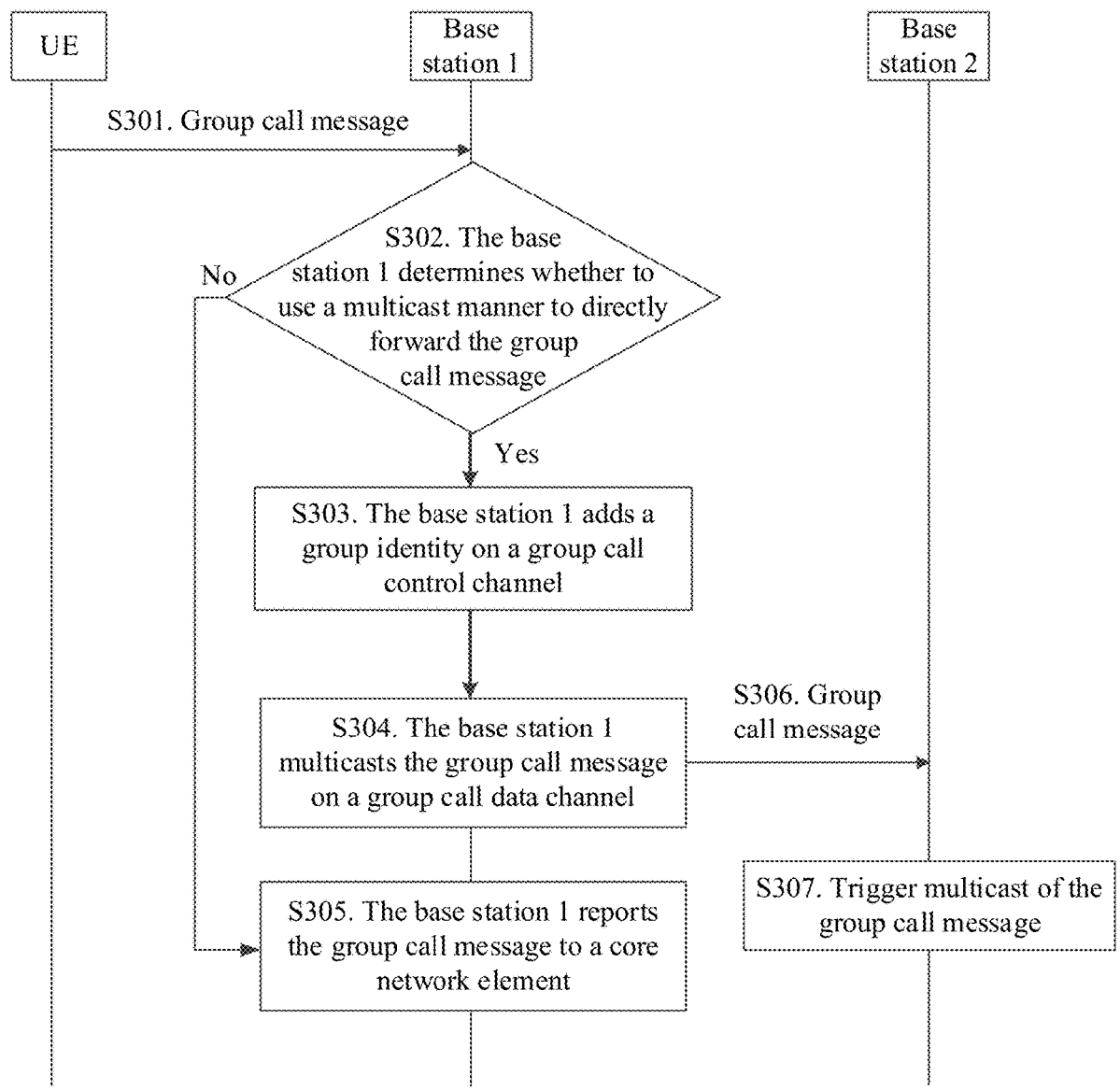
FIG. 3 is a flowchart of a communication method according to an embodiment of the application.

As shown in FIG. 3, the application provides a procedure of a communication method according to an embodiment of the application. In the procedure, UE may be the first terminal device in the communications system shown in FIG. 1 or FIG. 2, a base station 1 may be the first radio access network device in the communications system shown in FIG. 1 or FIG. 2, a base station 2 may be the second radio access network device in the communications system shown in FIG. 1 or FIG. 2, and a group call message may be the first message in the communications system shown in FIG. 1 or FIG. 2. The procedure includes the following operations.

Operation S301: The UE sends the group call message to the base station 1.

Operation S302: The base station 1 determines whether to use a multicast manner to directly forward the group call message. If yes, perform operation S303; otherwise, perform operation S305.

In an embodiment of the application, the following several manners may be used to determine whether to use the multicast manner to forward the group call message:

(1) Pre-agreeing: A dedicated base station direct forwarding bearer is set up in advance between the base station 1 and the UE. When the base station 1 receives the group call message on the dedicated base station direct forwarding bearer, it may be determined that the base station 1 needs to use the multicast manner to send or forward the group call message. For a description of the manner, refer to the description of the first case and/or the second case in the embodiment shown in FIG. 1.

(2) UE selection: The UE may carry a direct forwarding indication in the group call message. For example, the UE may use an existing bearer, and the indication is included in an L2 protocol layer of the existing bearer or a newly added adaptation layer. When determining that the group call message carries the direct forwarding indication, the base station 1 may determine that the base station 1 can use the multicast manner to forward the group call message. Optionally, otherwise, the base station 1 may determine that the base station 1 cannot use the multicast manner to forward the group call message. For a description of the manner, refer to the description of the third case in the embodiment shown in FIG. 1.

(3) Base station selection: The UE includes a QoS parameter in an L2 protocol layer or a newly added adaptation layer of the group call message, and the base station 1 determines, based on the QoS parameter, whether to directly multicast the group call message. For example, when the QoS parameter is greater than or equal to a preset value 1, the group call message may be directly multicast; otherwise, the group call message is sent to the core network element. For a description of the manner, refer to the description of the fourth case in the embodiment shown in FIG. 1.

Operation S303: The base station 1 adds a group identity to a group call control channel.

In an embodiment of the application, the base station 1 may broadcast group information obtained in advance (where for example, a multicast server/a core network element may pre-send group-related information to the base station 1, or the UE reports in advance group information of a group in which the UE is located to the base station 1). Then, after receiving a group call data packet sent by the UE/another base station, the base station 1 directly sends the group call data packet on the group call data channel.

In another embodiment of the application, after receiving the group call data packet sent by the UE, the base station 1 may add the group identity and/or the resource configuration information of the corresponding group call data channel to the group call control channel, and then send the group call data packet on a group call data channel. Currently, a single-cell point-to-multipoint (SC-PTM) control channel includes a plurality of pieces of single-cell point-to-multipoint information (SC-MTCH-Info), and each SC-MTCH-Info includes the following information elements IEs:

mbmsSessionInfo-r13
   g-RNTI-r13
   sc-mtch-schedulingInfo-r13
   mbmsSessionInfo includes a TMGI, a session ID, and the like.

In a possible form, an existing SC-PTM mechanism is used to add a new IE, for example, a V2X group ID, to the SC-PTM control channel. The form is as follows:

V2X group ID
   G-RNTI
   sc-mtch-schedulingInfo-r13
   Alternatively, the format is as follows:
   Choice{V2X group ID, mbmsSessionInfo}
   G-RNTI
   sc-mtch-schedulingInfo-r13

In an embodiment of the application, the base station 1 may include one or more of the group identity, a corresponding RAN-side group identity, the resource configuration information of the group call data channel, and the like on the group call control channel. The resource configuration information of the group call data channel may include a sending periodicity of group call data, start frame information, end frame information, subframe information, PRB occupancy information (a frequency resource block identifier, a start PRB of each frequency resource block, an end PRB of each frequency resource block, and the like), any combination thereof, or the like.

With respect to content of the group call control channel, the application provides the following several implementations:

(1) The base station 1 includes only a source group identity on the group call control channel, and the resource configuration information of the group call data channel may be stipulated in a protocol or broadcast by the base station in a system message in advance.

(2) The group call control channel of the base station 1 includes a source group identity and the resource configuration information of the group call data channel.

(3) The group call control channel of the base station 1 includes a source group identity, the RAN-side group identity, and a resource configuration of the group call data channel. A plurality of groups may share the group call data channel. Alternatively, a group call data channel resource may be allocated to each group. The UE detects, based on the configuration information of the group call control channel provided in (1), whether the group call control channel includes a source group identity of a source group in which the UE is located or a source group identity in which the UE is interested. If yes, the UE further obtains the group call data on the group call data channel based on the resource configuration information of the group call data channel. For example, the UE detects, on the group call data channel, whether there is a group identity (e.g., the source group identity/the RAN-side group identity) of a group in which the UE is located or a group identity in which the UE is interested, and an objective of using the RAN-side group identity is to reduce air interface overheads.

In an embodiment, when sending the group call data, the base station 1 may include the group identity in an L2 protocol stack such as a MAC CE or a MAC subheader. The base station 1 may scramble a physical downlink control channel (PDCCH) on the group call data channel by using the source group identity/the RAN-side group identity. Subsequently, the UE descrambles the PDCCH by using the source group identity/the RAN-side group identity, to determine whether a physical downlink data channel (e.g., physical downlink shared channel, PDSCH) includes the group call data corresponding to the group identity.

Operation S304: The base station 1 multicasts the group call message on the group call data channel.

Operation S305: The base station 1 reports the group call message to the core network element.

Optionally, in an embodiment of the application, before operation S301, the method may further include: sending, by the base station 1, configuration information of the group call control channel. The configuration information of the group call control channel may be sent in a broadcast manner, or may be sent by using an RRC message.

The configuration information of the group call control channel includes a combination of any one or more of the following: a sending periodicity of the group call control channel, start frame information, end frame information, subframe information, and PRB occupancy information (which may be a frequency resource block identifier, and/or a start PRB of each frequency resource block, and/or an end PRB of each frequency resource block). The configuration information may be specified in a protocol, or may be broadcast by the base station in a system message, or may be sent to the UE by using an RRC message.

Operation S306: The base station 1 forwards the group call message to the base station 2 through the user plane tunnel.

Operation S307: The base station 2 triggers multicast of the group call message.

In an embodiment of the application, for how the base station 2 triggers the multicast of the group call message, refer to a process in which the base station 1 multicasts the group call message. Details are not described again. In an embodiment of the application, for how the group call message is transmitted between the base station 1 and the base station 2, refer to the following several manners.

(1) A same direct forwarding tunnel is set up between the base station 1 and the base station 2. For example, the base station 1 sends a direct communication tunnel setup request to the base station 2, where the direct communication tunnel setup request carries a base station 1 identity (for example, a gNB ID), a base station 1-side tunnel endpoint address (for example, a GTP-U Tunnel Endpoint), and the like. For example, the direct communication tunnel setup request may carry the base station 1 identity+the base station 1-side tunnel endpoint address, or the base station 1 identity+a cell list (where the cell list includes one or more groups of cell identities+tunnel endpoint addresses). The request message may further include a group identity, a service type, a message type, a propagation range, QoS information, and the like that are supported or recommended by the base station 1. The base station 2 replies with a direct communication tunnel setup response, where the direct communication tunnel setup response may include a base station 2 identity+a base station 2-side tunnel endpoint address, or a cell identity+a tunnel endpoint address, and may further include the group identity, the service type, the message type, the propagation range, the QoS information that are confirmed to be supported, and a group identity, a service type, a message type, a propagation range, QoS information, and the like that are rejected to be supported. Then, when the group call message is forwarded between the base station 1 and the base station 2, one or more of a group identity (multicast)/destination node address (unicast), a service type, a message type, a propagation range, and QoS information are carried in a data packet header such as a GTP-U header/sub-header of the group call message. In this case, there may be only one direct forwarding tunnel set up between the base stations.

(2) A direct forwarding tunnel specific to a service type is set up between the base station 1 and the base station 2. For example, the base station 1 sends a direct communication tunnel setup request to the base station 2, where the direct communication tunnel setup request may carry a base station 1 identity, a service identity, a base station 1-side tunnel endpoint address (for example, a GTP-U Tunnel Endpoint), and the like. For example, the direct communication tunnel setup request carries the base station 1 identity+a service list (where the service list includes one or more groups of service identities+tunnel endpoint addresses). The base station 2 replies with a direct communication tunnel setup response, where the direct communication tunnel setup response may include a base station 2 identity, a base station 2-side tunnel endpoint address, and the like. Then, when the base station 1 forwards the group call message, one or more of a group identity (multicast)/destination node address (unicast), a message type, a propagation range, and QoS information are carried in an X2-U/Xn-U data packet header such as a GTP-U header/sub-header. If services and groups are in a one-to-one correspondence, for example, if Dst L2 IDs and PSIDs/ITS-AIDs are in a one-to-one correspondence, the group identity may not need to be carried. Subsequently, when the base station 1 sends data through the direct forwarding tunnel, the service identity does not need to be carried. That is, a receiving base station may identify a corresponding service type by using the base station 1-side tunnel endpoint address and/or the base station 2-side tunnel endpoint address that are/is carried in the direct forwarding tunnel. In this case, based on different service types, a plurality of direct forwarding tunnels that are in a one-to-one correspondence with the service types may be set up between the base stations.

(3) A direct forwarding tunnel specific to a group is set up between the base station 1 and the base station 2. For example, the base station 1 sends a direct communication tunnel setup request to the base station 2, where the direct communication tunnel setup request carries a base station 1 identity, a group identity, a base station 1-side tunnel endpoint address (for example, a GTP-U Tunnel Endpoint), and the like. The base station 2 replies with similar content. Then, when the group call message is forwarded between the base stations, one or more of a service type, a message type, a propagation range, and QoS information are carried in an X2-U/Xn-U data packet header such as a GTP-U header/sub-header. There is no one-to-one correspondence between groups and services. The group is, for example, a Platoon group or another temporary group. Subsequently, when the base station 1 sends data through the direct forwarding tunnel, the group identity does not need to be carried. That is, a receiving base station may identify a corresponding group identity by using the base station 1-side tunnel endpoint address and/or a base station 2-side tunnel endpoint address that are/is carried in the direct forwarding tunnel. In this case, based on different group identities, a plurality of direct forwarding tunnels that are in a one-to-one correspondence with the group identities may be set up between the base stations.

(4) A direct forwarding tunnel specific to QoS is set up between the base stations. For example, the base station 1 sends a direct communication tunnel setup request to the base station 2, where the direct communication tunnel setup request carries a base station 1 identity, a QoS identifier or parameter, a base station 1-side tunnel endpoint address (for example, a GTP-U Tunnel Endpoint), and the like. The base station 2 replies with similar content. Then, when the group call message is forwarded between the base stations, a group identity (multicast)/destination node address (unicast), a multicast/unicast indication, a service type, a message type, a propagation range, and the like are carried in an X2-U/Xn-U data packet header such as a GTP-U header/sub-header. Subsequently, when the base station 1 sends data through the direct forwarding tunnel, the QoS identifier/parameter does not need to be carried. That is, a receiving base station may identify a corresponding QoS identifier/parameter by using the base station 1-side tunnel endpoint address and/or a base station 2-side tunnel endpoint address that are/is carried in the direct forwarding tunnel. In this case, based on different QoS identifiers/parameters, a plurality of direct forwarding tunnels that are in a one-to-one correspondence with the QoS identifiers/parameters may be set up between the base stations.

Optionally, in an embodiment of the application, a dedicated user plane tunnel may alternatively not be set up between the base station 1 and the base station 2, and the group call message is directly sent by using a control plane message, that is, through X2-C or Xn-C. The group call message may include one or more of a group identity, a multicast/unicast indication, a message type, QoS information, a propagation range, and a to-be-transmitted group call message.

Optionally, in an embodiment of the application, an execution sequence of operation S301 to operation S307 is not limited. For example, operation S306 may be performed after operation S304, or may be performed after operation S301, or even may be performed after operation S305. For another example, operation S303 may be performed before operation S301.

Figure 4:
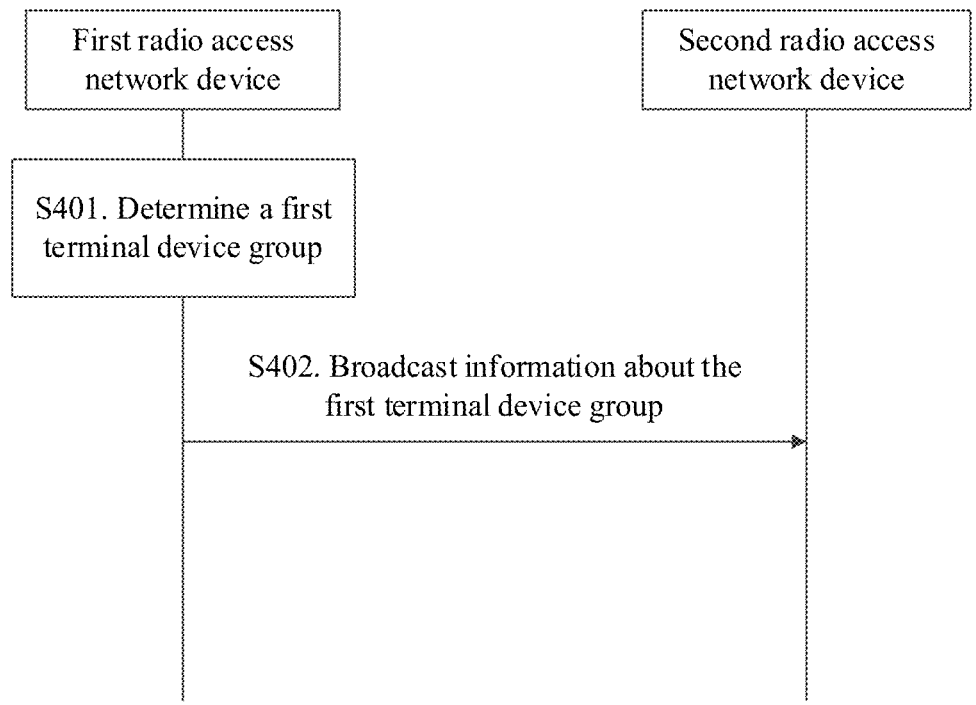
FIG. 4 is another flowchart of a communication method according to an embodiment of the application.

The application further provides a communication method. Terminal device group exchange between radio access network devices may be implemented by using the communication method. As shown in FIG. 4, the method according to an embodiment of the application is as follows:

Operation S401: A first radio access network device determines a first terminal device group.

The first terminal device group includes a second terminal device group and/or a third terminal device group. Alternatively, the first terminal device group includes at least one terminal device in a second terminal device group and/or at least one terminal device in a third terminal device group, the second terminal device group is a terminal device group within a management range of the first radio access network device, and the third terminal device group is a terminal device group within a management range of a second radio access network device.

Operation S402: The first radio access network device broadcasts information about the first terminal device group.

Optionally, a communication procedure shown in FIG. 4 may include only operation S401, and does not include operation S402.

Optionally, the method may further include: receiving, by the first radio access network device, request information from a terminal device, where the request information is used by the terminal device to request to join the second terminal device group, or the request information is used by the terminal device to request to join the third terminal device group.

In an embodiment of the application, when the request information is used by the terminal device to request to join the third terminal device group, the method further includes: sending, by the first radio access network device, a notification message, where the notification message is used to indicate that the terminal device requests to join the third terminal device group to the second radio access network device.

In a possible embodiment, before operation S401, the method further includes: receiving, by the first radio access network device, information about the third terminal device group from the second radio access network device.

For the communication method shown in FIG. 4, when the radio access network device is a base station, and the terminal device is UE, the application provides an embodiment. In an embodiment, a lead vehicle/another group user may report a group identity and other basic information to a base station in which the lead vehicle/another group user is located. In particular, the lead vehicle needs to provide a lead vehicle indication when performing reporting. Base stations exchange group identities and other basic group information of groups within management ranges of the base stations, or a group management controller sends, to a base station, group identities and other basic information of groups managed by the base station and another base station. The base station broadcasts group information about groups managed by the base station and a neighboring cell. After receiving the group information, UE selects an appropriate group based on information such as a route, a speed, and a destination of the UE. The UE requests to join a group from the base station, where the request includes a group identity. Alternatively, it is assumed that the base station does not broadcast the information about the first terminal device group. After the UE reports information such as a route, a speed, or a destination, the base station selects an appropriate group for the UE, and the base station indicates the UE to join a group, where the notification message may include a group identity. If UEs join a group managed by a neighboring base station, the base station indicates that N members are newly added to the XX group and indicates basic information of each member and the like to the neighboring base station. The notification message includes a group identity, a quantity of the newly added members, the basic information (including a ProSe Layer 2 ID) of each member, and the like.

It can be learned from the foregoing that the UE reports a group identity and other group information of a group in which the UE is located, and the base stations exchange group information of the groups within the management ranges of the base stations. The base stations broadcast the group information (optional). When the UEs join the group managed by the neighboring base station, the base station indicates this to the neighboring base station.

Figure 5:
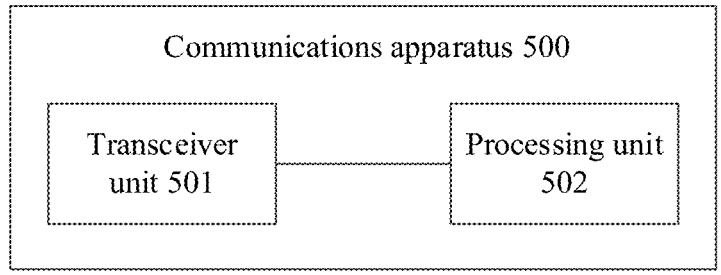
FIG. 5 is a schematic structural diagram of a communications apparatus according to an embodiment of the application.

With reference to the foregoing concept, as shown in FIG. 5, in an embodiment, the application further provides a communications apparatus 500, and the communications apparatus 500 may include a transceiver unit 501 and a processing unit 502.

In an embodiment of the application, the communications apparatus 500 may be applied to a first radio access network device. The transceiver unit 501 may be configured to receive a first message from a terminal device on a radio bearer, or the first radio access network device receives a first message from a second radio access network device through a user plane tunnel. The radio bearer is a bearer between the first radio access network device and the terminal device, and the user plane tunnel is a tunnel between the first radio access network device and the second radio access network device. The processing unit 502 may be configured to multicast the first message through a first air interface, where the first air interface is an air interface for communication between the first radio access network device and a terminal device within a management range of the first radio access network device.

In another embodiment of the application, the communications apparatus 500 may be applied to a terminal device. The processing unit 502 may be configured to generate a first message. The transceiver unit 501 may be configured to send the first message to a first radio access network device on a radio bearer, where the radio bearer is used by the first radio access network device to directly multicast the first message through a first air interface when the first radio access network device receives the first message, and the first air interface is an air interface for communication between the first radio access network device and a terminal device within a management range of the first radio access network device.

In still another embodiment of the application, the communications apparatus 500 may be applied to a second radio access network device. The processing unit 502 may be configured to generate a first message. The transceiver unit 501 may be configured to send the first message to a first radio access network device through a user plane tunnel, where the user plane tunnel is used by the first radio access network device to multicast the first message through a first air interface when the first radio access network device receives the first message, and the first air interface is an air interface for communication between the first radio access network device and a terminal device within a management range of the first radio access network device.

In an embodiment, for an execution process of the transceiver unit 501 and the processing unit 502, refer to the descriptions of the foregoing method embodiments. Details are not described herein again.

The first message is sent to the first radio access network device through the user plane tunnel, where the user plane tunnel is used by the first radio access network device to multicast the first message through a first air interface when the first radio access network device receives the first message, and the first air interface is an air interface for communication between the first radio access network device and a terminal device within a management range of the first radio access network device.

Figure 6:
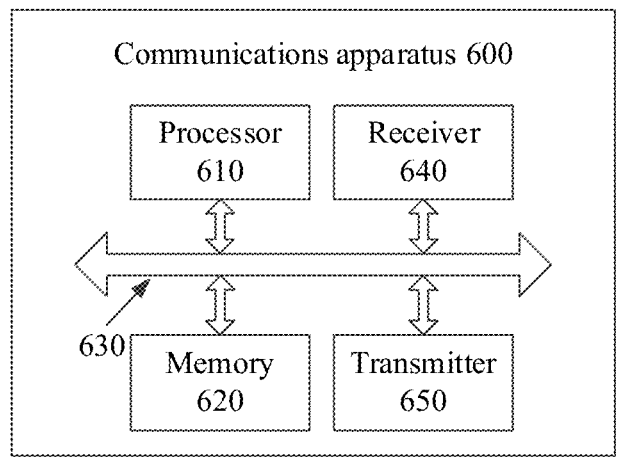
FIG. 6 is a schematic structural diagram of a communications device according to an embodiment of the application.

With reference to the foregoing concept, as shown in FIG. 6, an embodiment of the application further provides a communications apparatus 600. The communications apparatus 600 may correspond to the first radio access network device in the foregoing method, or may be applied to the second radio access network device in the foregoing method, or may correspond to the terminal device in the foregoing method. This is not limited herein.

The communications apparatus 600 may include a processor 610 and a memory 620. Further, the device 600 may further include a receiver 640 and a transmitter 650. Still further, the apparatus may further include a bus system 630.

The processor 610, the memory 620, the receiver 640, and the transmitter 650 are connected by using the bus system 630. The memory 620 is configured to store an instruction. The processor 610 is configured to execute the instruction stored in the memory 620, to control the receiver 640 to receive a signal and control the transmitter 650 to send a signal, to complete the operations of the first radio access network device or the second radio access network device in the foregoing method. The receiver 640 and the transmitter 650 may be a same physical entity or different physical entities. When being a same physical entity, the receiver 640 and the transmitter 650 may be collectively referred to as a transceiver. The memory 620 may be integrated into the processor 610, or may be disposed separately from the processor 610.

In an embodiment, functions of the receiver 640 and the transmitter 650 may be implemented by using a transceiver circuit or a dedicated transceiver chip. The processor 610 may be considered to be implemented by using a dedicated processing chip, a processing circuit, a processor, or a general-purpose chip.

In another embodiment, the radio access network device may be implemented by using a general-purpose computer. In an embodiment, program code for implementing functions of the processor 610, the receiver 640, and the transmitter 650 is stored in the memory, and a general-purpose processor implements the functions of the processor 610, the receiver 640, and the transmitter 650 by executing the code in the memory.

For concepts, explanations, detailed descriptions, and other operations of the apparatus that are related to the technical solution provided in an embodiment of the invention, refer to the descriptions about the content in the foregoing method or in another embodiment. Details are not described herein again.

In an embodiment of the application, the communications apparatus 600 may be applied to a first radio access network device. The receiver 640 may be configured to receive a first message from a terminal device on a radio bearer, or receive a first message from a second radio access network device through a user plane tunnel. The processor 610 is configured to multicast the first message through a first air interface, where the first air interface is an air interface for communication between the first radio access network device and a terminal device within a management range of the first radio access network device. The radio bearer is a bearer between the first radio access network device and the terminal device, and the user plane tunnel is a tunnel between the first radio access network device and the second radio access network device.

In another embodiment of the application, the communications apparatus 600 may be applied to a terminal device. The processor 610 is configured to generate a first message. The transmitter 650 is configured to send the first message to a first radio access network device on a radio bearer, where the radio bearer is used by the first radio access network device to directly multicast the first message through a first air interface when the first radio access network device receives the first message, and the first air interface is an air interface for communication between the first radio access network device and a terminal device within a management range of the first radio access network device.

In still another embodiment of the application, the communications apparatus 600 may be applied to a second radio access network device. The processor 610 may be configured to generate a first message. The transmitter 650 is configured to send the first message to a first radio access network device through a user plane tunnel, where the user plane tunnel is used by the first radio access network device to multicast the first message through a first air interface when the first radio access network device receives the first message, and the first air interface is an air interface for communication between the first radio access network device and a terminal device within a management range of the first radio access network device.

Figure 7:
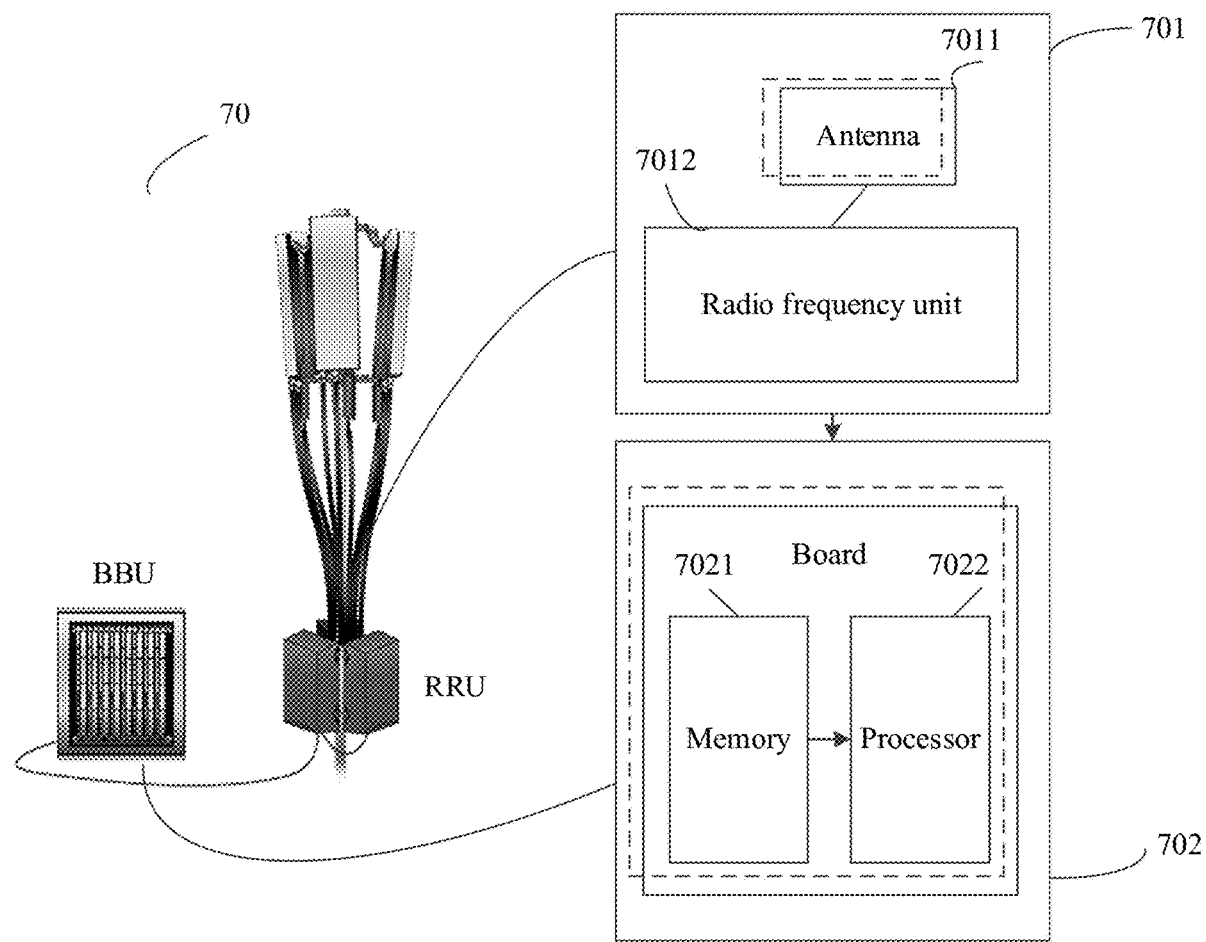
FIG. 7 is a schematic structural diagram of a radio access network device according to an embodiment of the application.

According to the foregoing method, FIG. 7 is a schematic structural diagram of a radio access network device, such as a base station, according to an embodiment of the invention. The base station may be applied to a scenario of the communications system shown in FIG. 1 or FIG. 2. A base station 70 includes one or more radio frequency units, for example, a remote radio unit (RRU) 701 and one or more baseband units (BBU) (which may also be referred to as a digital unit, DU) 702. The RRU 701 may be referred to as a transceiver unit, a transceiver machine, a transceiver circuit, a transceiver, or the like, and may include at least one antenna 7011 and a radio frequency unit 7012. The RRU 701 part may be configured to receive and send a radio frequency signal and perform conversion between a radio frequency signal and a baseband signal, for example, configured to send a signaling indication and/or a reference signal in the foregoing embodiments to user equipment. The BBU 702 part may be configured to perform baseband processing, control the base station, and the like. The RRU 701 and the BBU 702 may be physically disposed together, or may be physically separately disposed, that is, the RRU 701 and the BBU 702 may be in a distributed base station.

The BBU 702 is a control center of the base station, may also be referred to as a processing unit, and may be configured to complete baseband processing functions such as channel coding, multiplexing, modulation, and spectrum spreading. For example, the BBU (processing unit) may be configured to control the base station to perform the method in the communications system shown in FIG. 1 or FIG. 2.

In an embodiment, the BBU 702 may include one or more boards. A plurality of boards may jointly support a radio access network (for example, an LTE network) of a single access standard, or may separately support radio access networks of different access standards. The BBU 702 further includes a memory 7021 and a processor 7022. The memory 7021 is configured to store an instruction and data. For example, the memory 7021 stores a correspondence between information about a transmission delay difference and the transmission delay difference in the foregoing embodiment. The processor 7022 is configured to control the base station to perform an action. The memory 7021 and the processor 7022 may serve one or more boards. In other words, a memory and a processor may be independently disposed on each board. Alternatively, a plurality of boards may share a same memory and a same processor. In addition, a circuit may further be disposed on each board.

Figure 8:
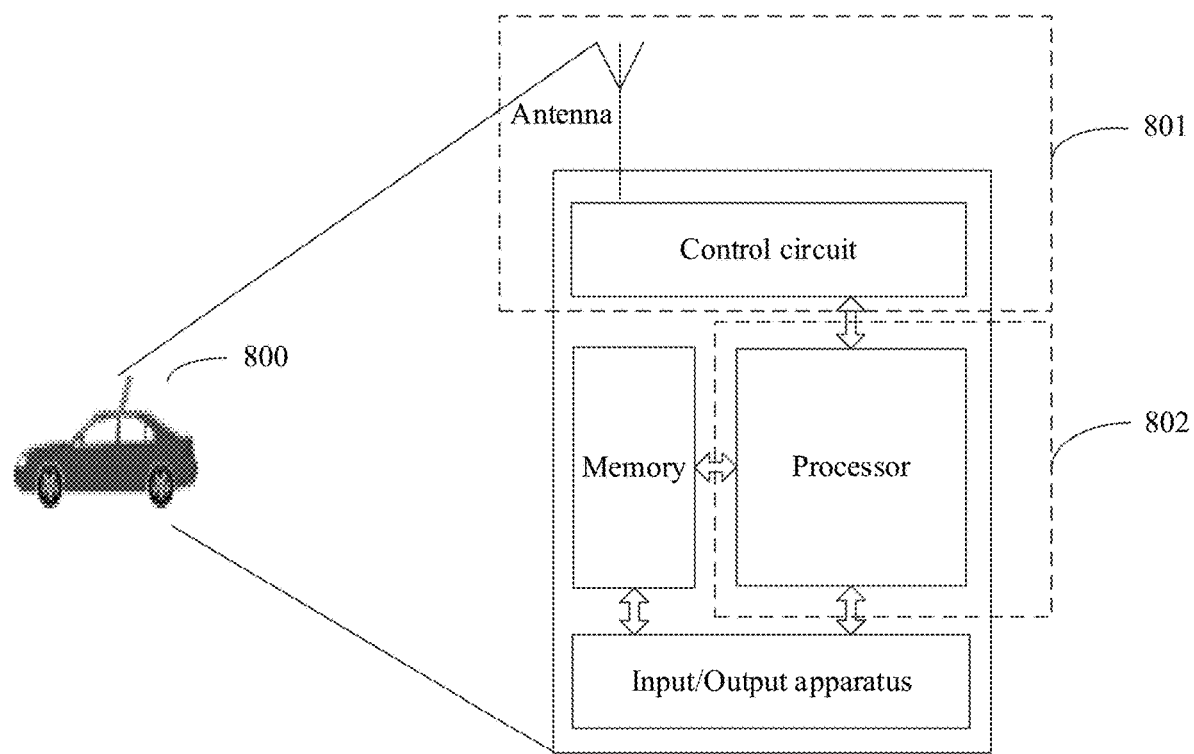
FIG. 8 is a schematic structural diagram of a terminal device according to an embodiment of the application.

FIG. 8 is a schematic structural diagram of a terminal device according to an embodiment of the application. The terminal device may be applicable to the communications system shown in FIG. 1 or FIG. 2. For ease of description, FIG. 8 shows only main components of the terminal device. As shown in FIG. 8, the terminal device 800 may include a processor, a memory, and a control circuit, and optionally, may further include an antenna and/or an input/output apparatus. The processor may be configured to: process a communication protocol and communication data, control the terminal device, execute a software program, and process data of the software program. The memory may be configured to store the software program and/or data. The control circuit may be configured to convert a baseband signal and a radio frequency signal and process the radio frequency signal. The control circuit together with the antenna may also be referred to as a transceiver, and may be configured to receive and send a radio frequency signal in a form of an electromagnetic wave. The input/output apparatus, for example, a touchscreen, a display screen, or a keyboard, may be configured to receive data entered by a user and output data to the user.

In an embodiment of the application, the processor may read the software program in the storage unit, interpret and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through an antenna. When data is sent to the user equipment, the radio frequency circuit receives a radio frequency signal through the antenna, converts the radio frequency signal into a baseband signal, and outputs the baseband signal to the processor, and the processor converts the baseband signal into data and processes the data.

One of ordinary skill in the art may understand that for ease of description, FIG. 8 shows only one memory and one processor. There may be a plurality of processors and a plurality of memories in actual user equipment. The memory may also be referred to as a storage medium, a storage device, or the like. This is not limited in an embodiment of the invention.

In an embodiment, the processor may include a baseband processor and a central processing unit. The baseband processor may be configured to process a communication protocol and communication data. The central processing unit may be configured to: control the entire user equipment, execute the software program, and process the data of the software program. The processor in FIG. 8 integrates functions of the baseband processor and the central processing unit. One of ordinary skill in the art may understand that the baseband processor and the central processing unit may be processors independent of each other, and are interconnected by using a technology such as a bus. One of ordinary skill in the art may understand that the user equipment may include a plurality of baseband processors to adapt to different network standards, the user equipment may include a plurality of central processing units to enhance a processing capability of the user equipment, and components of the user equipment may be connected via various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

In an embodiment, the antenna and the control circuit that have receiving and sending functions may be considered as a transceiver unit 801 of the terminal device 800, and the processor having a processing function may be considered as a processing unit 802 of the terminal device 800. As shown in FIG. 8, the terminal device 800 may include the transceiver unit 801 and the processing unit 802. The transceiver unit may also be referred to as a transceiver, a transceiver machine, a transceiver apparatus, or the like. Optionally, a component that is in the transceiver unit 801 and that is configured to implement a receiving function is considered as a receiving unit, and a component that is in the transceiver unit 801 and that is configured to implement a sending function is considered as a sending unit. In other words, the transceiver unit 801 includes the receiving unit and the sending unit. For example, the receiving unit may also be referred to as a receiving machine, a receiver, a receiver circuit, or the like, and the sending unit may also be referred to as a transmitting machine, a transmitter, a transmitter circuit, or the like.

According to the method provided in embodiments of the application, an embodiment of the present invention further provides a communications system, including one or more of the foregoing first radio access network device, second radio access network device, and terminal device.

Based on the foregoing embodiments, an embodiment of the application further provides a computer storage medium. The storage medium stores a software program, and when the software program is read and executed by one or more processors, the method provided in any one or more of the foregoing embodiments may be implemented. The computer storage medium may include: any medium that can store program code, such as a USB flash drive, a removable hard disk, a read-only memory, a random access memory, a magnetic disk, or an optical disc.

Based on the foregoing embodiments, an embodiment of the application further provides a chip. The chip includes a processor, configured to implement a function in any one or more of the foregoing embodiments, for example, obtain or process the information or the message in the foregoing methods. Optionally, the chip further includes a memory. The memory is configured to store a program instruction and data for execution to be performed by the processor. The chip may include a chip, or may include a chip and another discrete device.

In an embodiment, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data for the processor. A part of the memory may further include a non-volatile random access memory.

In addition to a data bus, the bus system may further include a power bus, a control bus, a status signal bus, and the like. However, for clear description, various types of buses in the figure are marked as a bus system.

In an embodiment, operations in the foregoing methods may be implemented by using a hardware integrated logical circuit in the processor, or by using an instruction in a form of software. The operations of the methods disclosed with reference to embodiments of the invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

What is claimed is:

1. A communication apparatus applied for a first radio access network device, comprising:
   at least one processor, and a memory coupled to the at least one processor;
   wherein the at least one processor is configured to:
   receive a first message from a terminal device on a radio bearer, or from a second radio access network device through a user plane tunnel, wherein the radio bearer is a bearer between the apparatus and the terminal device, and the user plane tunnel is a tunnel between the apparatus and the second radio access network device, the first message carrying an indication information that the first message is to be directly multicast via a first air interface; and
   directly multicast the first message through the first air interface based on the indication information wherein the first air interface is an air interface for communication between the apparatus and the terminal device within a management range of the apparatus, and wherein the first message is directly multicast through the first air interface and is not sent to a core network to reduce a delay.

2. The apparatus according to claim 1, wherein the radio bearer is a first radio bearer that is used to transmit the first message that meets a preset condition, and the preset condition is: the first message is transmitted on the first radio bearer and is directly multicast through the first air interface.

3. The apparatus according to claim 1, wherein the radio bearer is a second radio bearer that is used to transmit the first message that meets a preset condition, there is a correspondence between the second radio bearer and one or more of a group identity of the terminal device, a service identity of the terminal device, or a quality of service QoS parameter of the first message, and the preset condition is: the first message is transmitted on the second radio bearer and is directly multicast through the first air interface.

4. The apparatus according to claim 1, wherein the radio bearer is a third radio bearer that is used to transmit the first message that meets a preset condition, wherein the preset condition is: the first message is transmitted on the third radio bearer and is directly multicast through the first air interface, or the preset condition is: the first message is transmitted on the third radio bearer and the first message is reported to a core network element; and
the multicasting the first message through the first air interface comprises:
multicasting the first message through the first air interface when the first message carries a first indication, wherein the first indication is used to indicate the apparatus to directly multicast the first message through the first air interface when the apparatus receives the first message.

5. The apparatus according to claim 1, wherein
the radio bearer is a fourth radio bearer that is used to transmit the first message that meets a preset condition, wherein the preset condition is: the first message is transmitted on the fourth radio bearer and is directly multicast through the first air interface, or the preset condition is: the first message is transmitted on the fourth radio bearer and the first message is reported to a core network element; and
the multicasting the first message through a first air interface comprises:
multicasting the first message through the first air interface when a QoS parameter carried in the first message meets a predetermined condition.

6. The apparatus according to claim 1, wherein the user plane tunnel is a first user plane tunnel that is configured to forward the first message that meets a preset condition, and the preset condition is: the first message is forwarded through the first user plane tunnel and is directly multicast through the first air interface.

7. The apparatus according to claim 1, wherein the user plane tunnel is a second user plane tunnel that is configured to forward the first message that meets a preset condition, there is a correspondence between the second user plane tunnel and one or more of a group identity of the terminal device, a service identity of the terminal device, and a QoS parameter of the first message, and the preset condition is: the first message is forwarded through the second user plane tunnel and is directly multicast through the first air interface.

8. The apparatus according to claim 1, wherein
the multicasting the first message through the first air interface comprises:
determining, a group identity of the first message; and
multicasting, the first message through the first air interface based on the group identity of the first message.

9. The apparatus according to claim 8, wherein
the group identity of the first message is determined in as follows:
when a protocol header that carries the first message comprises the group identity, the apparatus obtains the group identity based on the protocol header that carries the first message; or
when there is a correspondence between the second radio bearer and the group identity of the terminal device, a protocol header that carries the first message does not comprise the group identity of the terminal device, and the apparatus determines the group identity based on the second radio bearer; or
when there is a correspondence between the second user plane tunnel and the group identity of the terminal device, a protocol header that carries the first message does not comprise the group identity of the terminal device, and the apparatus determines the group identity based on the second user plane tunnel.

10. The apparatus according to claim 1, wherein when there is a correspondence between the second radio bearer and a service identity of the terminal device, the protocol header that carries the first message does not comprise the service identity of the terminal device; or
when there is a correspondence between the second user plane tunnel and a service identity of the terminal device, the protocol header that carries the first message does not comprise the service identity of the terminal device.

11. The apparatus according to claim 1, wherein
the multicasting the first message through the first air interface comprises:
multicasting a notification message, wherein the notification message comprises a group identity of the first message; and
triggering multicast of the first message through the first air interface when receiving a first feedback message from the terminal device within the management range of the apparatus, wherein the first feedback message comprises the group identity of the first message.

12. The apparatus according to claim 1, wherein
the multicasting the first message through the first air interface comprises:
multicasting a notification message, wherein the notification message comprises a group identity of the first message and a configuration information that is of a preamble and that corresponds to the group identity; and
triggering multicast of the first message through the first air interface when receiving a second feedback message from the terminal device within the management range of the apparatus, wherein the second feedback message comprises a preamble, and the preamble is determined based on the configuration information of the preamble.

13. A communication apparatus applied for a terminal device, comprising:
at least one processor, and a memory coupled to the at least one processor;
wherein the at least one processor is configured to:
generate a first message, the first message carrying an indication information that the first message is to be directly multicast via a first air interface; and
send the first message to a first radio access network device on a radio bearer, wherein the first radio access network device is to directly multicast the first message through the first air interface based on the indication information, and the first air interface is an air interface for communication between the first radio access network device and the terminal device within a management range of the first radio access network device, and wherein the first message is directly multicast through the first air interface and is not sent to a core network to reduce a delay.

14. The apparatus according to claim 13, wherein
the radio bearer is a first radio bearer;
the sending the first message to the first radio access network device on the radio bearer comprises:
sending the first message to the first radio access network device on the first radio bearer, wherein
the first radio bearer is used to transmit the first message that meets a preset condition, and the preset condition is: the first message is transmitted on the first radio bearer and directly multicast through the first air interface.

15. The apparatus according to claim 13, wherein
the radio bearer is a second radio bearer;
the sending the first message to the first radio access network device on the radio bearer comprises:
sending the first message to the first radio access network device on the second radio bearer, wherein
the second radio bearer is used to transmit the first message that meets a preset condition, there is a correspondence between the second radio bearer and one or more of a group identity of the apparatus, a service identity of the apparatus, or a quality of service QoS parameter of the first message, and the preset condition is: the first message is transmitted on the second radio bearer and is directly multicast through the first air interface.

16. The apparatus according to claim 15, wherein
the radio bearer is a third radio bearer, and the sending the first message to the first radio access network device on the radio bearer comprises:
sending the first message to the first radio access network device on the third radio bearer, wherein
the third radio bearer is used to transmit the first message that meets a preset condition, wherein the preset condition is: the first message is transmitted on the third radio bearer and is directly multicast through the first air interface, or the preset condition is: the first message is transmitted on the third radio bearer and the first message is reported to a core network element; and the first message carries a first indication, and the first indication is used to indicate the first radio access network device to directly multicast the first message through the first air interface when the first radio access network device receives the first message.

17. The apparatus according to claim 13, wherein
the radio bearer is a fourth radio bearer;
the sending the first message to the first radio access network device on the radio bearer comprises:
sending, the first message to the first radio access network device on the fourth radio bearer, wherein
the fourth radio bearer is used to transmit the first message that meets a preset condition, wherein the preset condition is: the first message is transmitted on the fourth radio bearer and is directly multicast through the first air interface, or the preset condition is: the first message is transmitted on the fourth radio bearer and the first message is reported to a core network element; and the first message carries a QoS parameter.

18. The apparatus according to claim 15, wherein
when there is a correspondence between the second radio bearer and the group identity of the apparatus, a protocol header that carries the first message does not comprise the group identity of the apparatus; or
when there is a correspondence between the second radio bearer and the service identity of the apparatus, the protocol header that carries the first message does not comprise the service identity of the apparatus.

19. A communication apparatus applied for a second radio access network device, comprising:
at least one processor, and a memory coupled to the at least one processor;
wherein the at least one processor is configured to:
generate a first message, the first message carrying an indication information that the first message is to be directly multicast via a first air interface; and
send the first message to a first radio access network device through a user plane tunnel, wherein the first radio access network device is to directly multicast the first message through the first air interface based on the indication information, and the first air interface is an air interface for communication between the first radio access network device and a terminal device within a management range of the first radio access network device, and wherein the first message is directly multicast through the first air interface and is not sent to a core network to reduce a delay.

20. The apparatus according to claim 19, wherein
the user plane tunnel is a first user plane tunnel, and the sending the first message to the first radio access network device through the user plane tunnel comprises:
sending the first message to the first radio access network device through the first user plane tunnel, wherein
the first user plane tunnel is configured to forward the first message that meets a preset condition, and the preset condition is: the first message is forwarded through the first user plane tunnel and is directly multicast through the first air interface.

* * * * *